(12) United States Patent
Maguire

(10) Patent No.: US 7,784,545 B2
(45) Date of Patent: *Aug. 31, 2010

(54) IN-SITU METHOD OF FRACTURING GAS SHALE AND GEOTHERMAL AREAS

(76) Inventor: James Q. Maguire, 1515 W. Main, Norman, OK (US) 73069

( * ) Notice: Subject to any disclaimer, the term of this patent is extended or adjusted under 35 U.S.C. 154(b) by 550 days.

This patent is subject to a terminal disclaimer.

(21) Appl. No.: 11/637,386

(22) Filed: Dec. 12, 2006

(65) Prior Publication Data

US 2007/0107901 A1 May 17, 2007

Related U.S. Application Data

(63) Continuation-in-part of application No. 11/074,150, filed on Mar. 7, 2005, now Pat. No. 7,198,107.

(60) Provisional application No. 60/571,183, filed on May 14, 2004.

(51) Int. Cl.
*E21B 43/25* (2006.01)
(52) U.S. Cl. ................... 166/308.1; 166/50; 166/306
(58) Field of Classification Search ................. None
See application file for complete search history.

(56) References Cited

U.S. PATENT DOCUMENTS

| | | | |
|---|---|---|---|
| 3,612,192 A | 4/1969 | Maguire, Jr. | |
| 4,087,130 A * | 5/1978 | Garrett | 299/2 |
| 4,265,310 A | 5/1981 | Britton et al. | |
| 5,558,160 A | 9/1996 | Tudor | |
| 7,264,049 B2 * | 9/2007 | Maguire | 166/245 |
| 7,416,022 B2 * | 8/2008 | Maguire | 166/245 |
| 7,516,784 B2 * | 4/2009 | Maguire | 166/245 |
| 2003/0178195 A1 | 9/2003 | Agee et al. | |

OTHER PUBLICATIONS

Harry C. Carpenter & Harold W. Sohns, From Annual symposium on Oil Shale-1968, Application of Aboveground Retorting Variables to in Situ Oil Shale Processing, p. 815.
Memo to James Q. Maguire, Inc., from William W. Lewis dated May 28, 2002, regarding Air Separation Units.
C.H. Bowman, dated Mar. 1965, A Two-Spot Combustion Recovery Project, Society of Petroleum Engineers of Aime.
Colorado School of Mines Research Institute, In-Situ Processing, Section 6 p. 51 date not available.
Isothermal Properties for Nitrogen, dated Jun. 17, 2003, Fluid Data.

* cited by examiner

*Primary Examiner*—Zakiya W Bates
*Assistant Examiner*—Angela M DiTrani
(74) *Attorney, Agent, or Firm*—Dunlap Codding, P.C.

(57) ABSTRACT

A method is provided for in-situ production of oil shale, gas via gas (methane) hydrates and gas shale, and steam via geothermal formations wherein a network of fractures is formed by injecting liquified gases into at least one substantially horizontally disposed fracturing borehole. Thereafter, heat can be applied to liquify the kerogen or to dissociate the gas (methane) hydrates so that oil shale oil and/or gases can be recovered from the fractured formations.

23 Claims, 3 Drawing Sheets

IN-SITU METHOD OF FRACTURING GAS SHALE AND GEOTHERMAL AREAS

CROSS-REFERENCE TO RELATED APPLICATIONS

This application is a continuation-in-part of U.S. Ser. No. 11/074,150, filed Mar. 7, 2005; now U.S. Pat. No. 7,198,107 which claims benefit of U.S. Provisional Application 60/571,183, filed May 14, 2004, both of which are incorporated herein by reference in its entirety.

STATEMENT REGARDING FEDERALLY SPONSORED RESEARCH OR DEVELOPMENT

Not applicable.

BACKGROUND OF THE INVENTION

1. Field of the Invention

The present invention relates to in-situ methods of producing oil shale, gas shale, geothermal areas, and gas (methane) hydrates, and more particularly but not by way of limitation, to methods of forming fractures in formations by injecting liquified gases into at least one substantially horizontally disposed fracturing borehole drilled into the formation.

2. Brief Description of Related Art

Oil shale formations underlie large sections of Western Colorado, Eastern Utah and Southern Wyoming. These formations can be several thousand feet thick and contain more than 500 billion barrels of oil shale oil. Such oil shale formations consist of rock minerals combined with kerogen, a carbonaceous material which is solid material combined with rock minerals.

Earlier attempts to produce oil shale oil largely consisted of surface mining, crushing, and retorting. The efforts proved too costly and environmentally unfriendly. However, at temperatures between six hundred and nine hundred degrees Fahrenheit, the kerogen liquefies and becomes mobile. This process is referred to as pyrolysis. In pyrolysis, kerogen is either heated with hot gases or steam, or undergoes combustion by igniting the kerogen itself and injecting air or oxygen to support combustion.

After the kerogen beyond the combustion front reaches a temperature of 600 to 900 degrees Fahrenheit, the lighter elements liquify and migrate away. What remains, is the residual and less desirable components of the kerogen and it is the residual and less desirable components that are consumed in the combustion process.

When drilling into gas hydrate zones in subterranean formations problems are often encountered because the heat of drilling fluids warms the hydrates near the wellbore, dissociating them and creating craters and sink holes against the casing wellbore.

Therefore, new and improved methods are being sought for producing oil shale oil, gas shale, geothermal areas, and gas from gas hydrates in-situ which overcome various problems, including those described above. It is to such new and improved methods that the present invention is directed.

SUMMARY OF THE INVENTION

Figure 1:
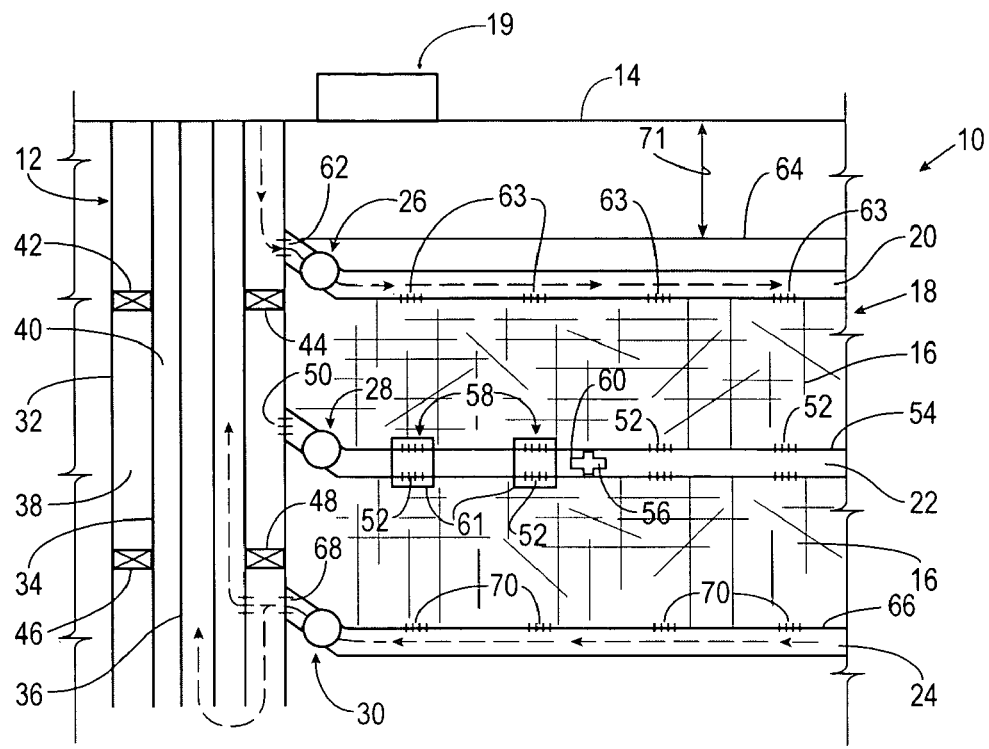
FIG. 1 is a pictorial representation of a fractured formation containing oil shale wherein the formation has been fractured in accordance with the present invention.

In accordance with the present invention, a method for forming fractures in a formation to enhance recovery of oil shale oil from shale oil, gas from gas hydrates and gas shale, and steam from geothermal wells is provided. In one aspect, the method of forming fractures in a formation includes providing a substantially vertically disposed borehole (i.e. a motherbore) and a plurality of substantially horizontally disposed boreholes extending outwardly from the substantially vertically disposed borehole. Each of the substantially horizontally disposed boreholes is provided with a remotely controlled valve assembly so that the substantially horizontally disposed boreholes can be selectively closed off from the wellbore or selectively opened to provide fluid communication between one or more of the substantially horizontally disposed boreholes and the substantially extending vertically extending borehole. Of the plurality of substantially horizontally disposed boreholes, at least one is an injection borehole, at least one is a fracturing borehole, and at least one is a production borehole.

To fracture the formation so that hydrocarbon products from gas hydrates, oil shale, and gas shale and steam from geothermal wells can be recovered, the valve assemblies associated with the at least one injection borehole and the at least one is a production borehole are closed and the remotely controlled valve assembly associated with the at least one fracturing borehole is opened. An initial quantity of liquified gas is introduced into the at least one substantially horizontally disposed fracturing borehole whereby liquified gas is discharged into the formation. The initial quantity of liquified gas is allowed to vaporize in a portion of the at least one substantially horizontally disposed fracturing borehole whereby a resulting increase in pressure in the at least one substantially horizontally disposed fracturing borehole forms fractures in the formation. Once the initial quantity of liquified gas has expanded and produced an initial network of fractures in the formation, an additional quantity of liquified gas is introduced into the at least one substantially horizontally disposed fracturing borehole. The additional quantity of liquified gas is allowed to vaporize in the fractures in the formation created by the injection of the initial quantity of liquified gas into the at least one substantially horizontally disposed fracturing borehole whereby a resulting increase in pressure in the at least one substantially horizontally disposed fracturing borehole forms additional fractures in the formation (i.e. a network of cross fractures).

Once the formation has been fractured by the introduction of the initial and additional quantities of liquified gas, the remotely controlled valve associated with the at least one substantially horizontally disposed fracturing borehole is closed and the remotely controlled valves associated with the at least one substantially horizontally disposed injection borehole and the at least one substantially horizontally disposed production borehole are opened. Heated gases, heated oxygen or heated air are then introduced into the at least one substantially horizontally disposed injection borehole and distributed across the chimney so that the heated gases, heated oxygen, heated air, or direct combustion of adjacent oil shale, create the heat necessary to liquify the kerogen as same move downward through the fracture system. The heated gases, oxygen, or air function to support combustion of the kerogen on the face of the formation. That is, at each fracture face, heating occurs and the kerogen liquefies downward through the fractures to the substantially horizontally disposed production borehole along with water and released gases.

When the multiple fracture system is provided with more than one substantially horizontally disposed injection borehole, more than one substantially horizontally disposed fracturing borehole, and more than one substantially horizontally extending production borehole, the remote controlled valves associated with each of such boreholes is closed during introduction of the initial quantity and the additional quantity of the liquified gas except for the fracturing borehole into which the liquified gas is being introduced to provide the desired network of fractures in the formation. It should be noted that the multiple fracture system is designed to provide an effective amount of overburden formation to insure that the fractures do not penetrate the surface.

DETAILED DESCRIPTION

The method of producing oil shale oil, gas via gas hydrates or gas shale, and steam from geothermal areas in accordance with the present invention is to produce the oil shale oil, gas via gas hydrates or gas shale, and steam from geothermal areas "in-situ" or "in-place".

To accomplish in-situ production of oil shale oil, it is necessary to heat the kerogen, but since the oil shale has little or no permeability, a multiple fracture system 10 must be established in order to heat the oil shale in a timely manner. After the fractures are created, stream or heated gases or direct combustion of adjacent oil shale in the fractures will create the heat needed to liquify the kerogen so that it can travel through the multiple fracture system 10 and into a vertical borehole 12 (i.e. the "motherbore") whereby the oil shale oil and gas is delivered to the surface 14 and recovered in a conventional manner.

Referring now to FIG. 1, the method of forming fractures 16 in an oil shale formation 18 to recover oil shale oil and gases from the oil shale formation 18 includes providing the substantially vertically disposed borehole 12 (i.e. a motherbore), a supply of liquified gas 19 and a plurality of substantially horizontally disposed boreholes 20, 22 and 24 extending outwardly from the substantially vertically disposed borehole 12.

The multiple fracturing system 10 further includes conventional production equipment (not shown) which is associated with the substantially vertically disposed borehole 12 for the recovery of oil shale oil and gas recovered from the oil shale formation 18 in accordance with the present invention.

Each of the substantially horizontally disposed boreholes 20, 22 and 24 is provided with remotely controlled valve assemblies 26, 28 and 30, respectively, so that the substantially horizontally disposed boreholes 20, 22 and 24 can be closed off from the substantially horizontally disposed borehole 12 or selectively opened to provide fluid communication between selected substantially horizontally disposed boreholes 20, 22 and 24 and the substantially vertically extending borehole 12. As shown in FIG. 1, at least one of the substantially horizontally disposed boreholes, such as borehole 20, is an injection borehole, at least one of the substantially horizontally disposed boreholes, such as borehole 22, is a fracturing borehole, and at least one of the substantially horizontally disposed boreholes, such as borehole 24, is a production borehole.

Prior to fracturing the formation, the substantially vertically disposed borehole 12 is provided with a cemented outer casing 32. After fracturing, a medium or inner casing 34 is disposed within the outer casing 32 and lowered to the bottom and tubing 36 is disposed within the medium casing 34. A first annulus 38 is formed between the cemented outer casing 32 and the medium or inner casing 34; and a second annulus 40 is formed between the tubing 36 and the medium or inner casing 34. Packers 42, 44, 46 and 48 are selectively positioned within the first annulus 38 for closing off portions of the formation 18. Such a configuration permits fluid communication between the substantially horizontally disposed injection borehole 20 and the substantially horizontally disposed production borehole 24 via the fracture 16 formed in the formation 18. Further, by running the uncemented medium or inner casing 34, the tubing 36 and appropriate packers 42, 44, 46 and 48, heated gases or oxygen or air for direct combustion can be injected into the upper or injection borehole 20 and distributed across the chimney for subsequent downward movement through the fractures 16. At each face, heating occurs and the kerogen liquefies and proceeds downward through the fractures 16 of the formation 18 to the substantially horizontally disposed production borehole 24.

To fracture the formation 18 so that hydrocarbon products such as oil shale oil and gas can be recovered, the valve assemblies 26 and 30 associated with the substantially horizontally disposed injection borehole 20 and the substantially horizontally disposed production borehole 24, respectively, are closed and the remotely controlled valve assembly 28 associated with the substantially horizontally disposed fracturing borehole 22 is opened. In addition the packers 46 and 48 are installed at a desired position in the first annulus 38 at a position below perforations 50 in the outer casing 32 so as to provide fluid communication between the first annulus 38 and the substantially horizontally disposed fracturing borehole 22.

Thereafter, an initial quantity of liquified gas is introduced into the substantially horizontally disposed fracturing borehole 22 whereby liquified gas is discharged into the formation 18 via perforations 52 provided at selected positions in a casing 54 surrounding the substantially horizontally disposed fracturing borehole 22. The casing 54 surrounding the substantially horizontally disposed fracturing borehole 22 is provided with a plug catcher 56 which is positioned at about the midpoint of the casing 54. A plurality of rotating sleeve assemblies 58 are supported on the casing 54 for selectively opening and closing off the perforations 52 upstream of the plug catcher 56. When a fracture treatment commences, the rotating sleeve assemblies 58 are closed and the liquified gas goes to the farthest set of downstream perforations 52 in the casing 54. The initial quantity of liquified gas is allowed to vaporize in a portion of the substantially horizontally disposed fracturing borehole 22 whereby a resulting increase in pressure in the substantially horizontally disposed fracturing borehole 22 forms fractures 16 in the formation 18. Once the initial quantity of liquified gas has expanded and produced an initial network of fractures 16 in the formation 18, an additional quantity of liquified gas is introduced into the substantially horizontally disposed fracturing borehole 22. The additional quantity of liquified gas is allowed to vaporize in the fractures 16 in the formation 18 created by the injection of the initial quantity of liquified gas into the substantially horizontally disposed fracturing borehole 22 whereby a resulting increase in pressure in the substantially horizontally disposed fracturing borehole 22 forms additional fractures 16 in the formation 18 (i.e. a network of cross fractures).

After the first set of perforations 52 is treated, a casing plug 60 is pumped into the substantially horizontally disposed fracturing borehole 22 and seats in the plug catcher 56. While being pumped into the substantially horizontally disposed fracturing borehole 22, the casing plug 60, which contains a radio transmitter or other remote control device, activates the rotating sleeve assemblies 58. The rotating sleeve assemblies 58 include a rotating sleeve 61 which is perforated on opposite sides thereof such that upon rotation of the rotating sleeves 61 the perforations 52 upstream of the plug catcher 56 and the casing plug 60 are opened. Remote controlled rotating sleeves are well known in the art, as are remote control devices capable of activating such rotating sleeves. Thus, no further description of such are believed necessary to permit one skilled in the art to understand and practice the present invention.

To prevent fluids from entering the previously fractured perforations which will be at a lower pressure than the breakdown pressure of the upstream perforations, a packer (not shown) can be set upstream of the plug catcher 56 in a conventional manner.

Once the formation 18 has been fractured by the introduction of the initial and additional quantities of liquified gas, the remotely controlled valve assembly 28 associated with the substantially horizontally disposed fracturing borehole 22 is closed and the remotely controlled valve assemblies 26 and 30 associated with the substantially horizontally disposed injection borehole 20 and the substantially horizontally disposed production borehole 24, respectively, are opened. Further, packers 42 and 44 are installed at a desired position in the first annulus 38 at a position below perforations 62 in the cemented outer casing 32 to provide fluid communication between the first annulus 38 and the substantially horizontally disposed injection borehole 20. Perforations 63 are also provided in a casing 64 of the substantially horizontally disposed injection borehole 20. Thus, heated gases, oxygen or air can be introduced into the substantially horizontally disposed injection borehole 20 via the first annulus 38, the remotely controlled valve assembly 26 and distributed across the chimney so that the heated gases, oxygen, air, or direct combustion of adjacent oil shale, create the heat necessary to liquify the kerogen as same exits the substantially horizontally disposed injection borehole 20 via the perforations 63 in the casing 64 for downward movement through the fractures 16 towards the substantially horizontally disposed production borehole 24. The heated gases, oxygen, or air function to support combustion of the kerogen on the face of the formation 18. That is, at each fracture face heating occurs and the kerogen liquefies and travels downward through the fractures 16 to the substantially horizontally disposed production borehole 24 along with water and released gases.

The casings 64, 54 and 66 of the substantially horizontally disposed boreholes 20, 22 and 24 are not cemented, as is the outer casing 32 of substantially vertically disposed borehole 12. Further, the perforations 62, 50 and 68 provided in selected portions of the cemented outer casing 32 of the substantially vertically disposed borehole 12 provides fluid communication with the substantially vertically disposed borehole 12 and each of the substantially horizontally disposed boreholes 20, 22 and 24 via the remotely controlled valve assemblies 26, 28 and 30 substantially as shown in FIG. 1.

As previously stated, perforations 63, 52, and 70, are provided in the casings 64, 54 and 66, respectively, of each of the substantially horizontally disposed boreholes 20, 22 and 24. Thus, the introduction of the initial quantity of liquified gas and the additional quantity of liquified gas into the formation 18, as well as the network of fractures 16 thereby produced, is controllable by the position and number of perforations 52 present in the casing 54 of the substantially horizontally disposed fracturing borehole 22. Further, the substantially horizontally disposed fracturing borehole 22, permits the creation of multiple fractures 16 which enhances recovery of oil shale oil from oil shale or gas from gas hydrates in accordance with the present invention.

When the multiple fracture system 10 is provided with more than one substantially horizontally disposed injection borehole 20, more than one substantially horizontally disposed fracturing borehole 22, and more than one substantially horizontally disposed production borehole 24, the remote controlled valves 26, 28 and 30 associated with each of such boreholes is closed during introduction of the initial quantity and the additional quantity of the liquified gas except for the fracturing borehole 22 into which the liquified gas is being introduced to provide the desired network of fractures 16 in the formation 18. It should be noted that the multiple fracture system 10 is designed to provide an effective amount of overburden formation 71 to insure that the fractures 16 do not penetrate the surface 14.

To create the multiple fracture system 10, a liquified gas, such as liquid nitrogen, is injected into a substantially horizontally disposed fracturing borehole 22 via the vertical borehole 12 at very high rates and a temperature of about −320° Fahrenheit. After cool-down, the liquid nitrogen will enter created fractures 16 and then vaporize. At standard temperatures and pressure a cubic foot of liquid nitrogen contains 696 SCF of gaseous nitrogen after vaporization.

The critical temperature of liquid nitrogen is −232° R (−228° F.) and its critical pressure is 492 psi. At standard condition, its temperature is −140° R (−320° F.) and pressure is 14.7 psia (pounds per square inch absolute). After the liquid nitrogen enters a fracture and warms up to above −232° R (−228° F.) it will immediately vaporize and attempt to greatly increase its volume.

As will be described in detail later, liquid nitrogen injected at a fracturing pressure of 500 psi will increase its volume by 14 fold at a temperature of −75° F. If, however, no increase in fracture volume occurs, the expansion pressure would increase to approximately 7,000 psia at a temperature of −385° R (−75° F.). See National Institute Standards Technology Tables for the Isothermal Properties For Nitrogen.

The fracture would not maintain a constant volume but neither would it expand instantaneously to maintain the fracturing pressure at 500 psi. Instead a fracturing pressure of about 2000-3000 psia could be maintained in an initial major fracture requiring only 500 psia to propagate. The net effect is to create vertical fractures perpendicular to the initial major fracture despite regional stresses both vertical and horizontal. The rapid increase in expansion pressure coupled with a very high rate of liquid nitrogen injection results in a continuing low level explosion that will create hundreds of cross-hatched or secondary vertical fractures 16 as illustrated in FIG. 1.

As will be described later herein, a ½ length fracture of 220 feet in length and height and 0.2 inches wide will contain 806 cubic feet of void space. An injection rate of 5 BPM of liquid nitrogen will result in 393 cubic feet of vaporized nitrogen being injected at an expansion rate of 14 fold. Therefore, approximately 2 minutes of injection would be required to fill the fracture. However, during this time period the fracture may grow to full length. Thus, during the 2 minute time period an additional 5 barrels of liquid nitrogen is injected.

Also to be considered, a 220 foot fracture could not be created in just 2 minutes of injection. The net effect is a buildup in pressure well beyond the fracturing pressure of 500 psia which would be in the range of a low level explosion. Normally, because of its low Reynold's Number, vaporized nitrogen will not attain significant friction losses even at very high rates of injection because it will still be in laminas flow. However, significant friction pressure might occur because as liquid nitrogen in a fracture vaporizes, it rapidly builds volume and this "churning" could destroy the laminar flow streamlines and could result in friction against the fracture faces. If friction pressure occurs, it would only add to the pressure of expansion of the liquid nitrogen. In addition, as the cryogenic vaporized nitrogen gas proceeds down a fracture a continuous expansion will occur because of the significant increase in temperature.

The process of the present invention will create hundreds of cross-hatched fractures 16 as indicated in FIG. 1. Because of the extensive fracturing, where fractures could be as close as 6 feet apart, and because of the explosive nature of the nitrogen expansion it is believed that no propping of the fractures will be necessary. If, however, closure does occur, the fractures can be re-opened by the injection pressure necessary to inject heating or combustion gases into the fracture system 10.

In addition, water released by the combustion process will vaporize to steam and expand to double its water volume. The combustion residue gases will also expand. These expansion forces should offset the narrowing of the fractures because of heat related expansion.

Figure 2:
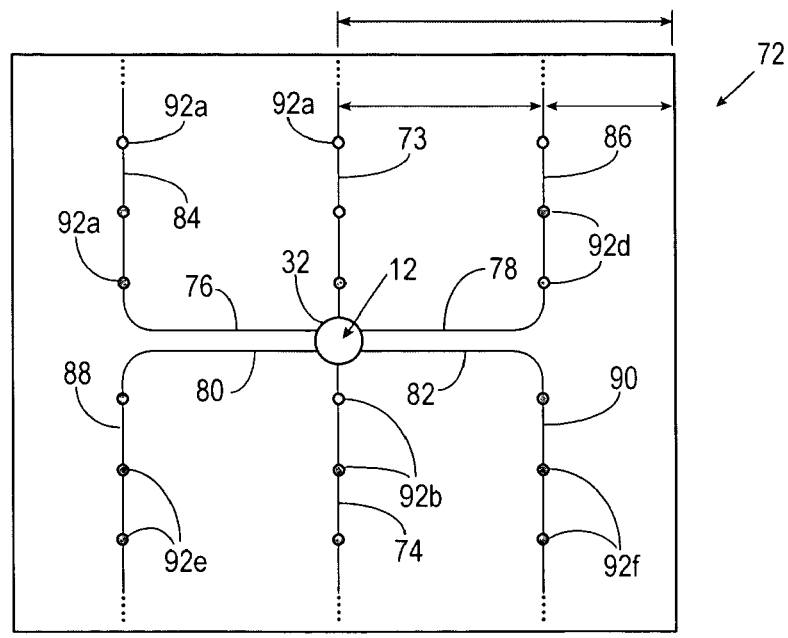
FIG. 2 is a pictorial representation of a 40 acre spacing for drilling and fracturing a subterranean formation in accordance with the present invention.

For illustration purposes, a forty acre spacing well 72 is drilled in a manner shown in FIG. 2. The substantially vertically disposed borehole 12 is first drilled to provide at least 600 feet of overburden formation 71 (FIG. 1) above the top of the oil shale zone or deeper in the oil shale zone for adequate coverage so that vertical fractures do not penetrate to the surface. The substantially vertically disposed borehole 12 is then cased with the cemented outer casing 32 herein before described.

Two boreholes 73 and 74 are drilled opposite each other from the substantially vertically disposed borehole 12 in a direction perpendicular to the direction of the least regional stresses. Four connecting boreholes 76, 78, 80 and 82 are drilled perpendicular to the boreholes 73 and 74 and the four connecting boreholes 76, 78, 80 and 82 extend a distance of 440 feet (for a 40-acre spacing) from the substantially vertically disposed borehole 12. Four ½ radius boreholes 84, 86, 88 and 90 are drilled and connect with the connecting boreholes 76, 78, 80 and 82 substantially as shown. That is, the borehole 84 is connected to the end of the connecting borehole 76 and the borehole 86 is connected to the end of the connecting borehole 78 so that the boreholes 84 and 86 are substantially parallel to the borehole 73. Similarly, the borehole 88 is connected to the end of the connecting borehole 80 and the borehole 90 is connected to the end of the connecting borehole 82 so that the boreholes 88 and 90 are substantially parallel to the borehole 74. Thus, the boreholes 73, 84, 86 and 74, 88 and 90 would be at the midpoint of a 220 foot section of oil shale.

Since each ½ fracture would have to extend 220 feet horizontally to meet up with a ½ fracture of an adjacent borehole, the vertical fracture will also extend 220 feet in height. In practice, the injection of volumes of liquid gas, such as liquid nitrogen, beyond the necessity of creating 220 feet ½ length fractures will extend the fracturing deeper than 220 feet into the oil shale. Further, each of the fracturing boreholes is perforated as herein described. (see Fracture Creation Section).

In thicker sections (some oil shales are 2000 feet thick) it may be advantageous to drill additional wells to exploit the deeper sediments rather than to drill additional boreholes in the same well which would take years to heat. Additional horizontal boreholes in the same configuration may also be drilled at the top of the oil shale zone to distribute air, steam, oxygen or heated gasses to the top of the herein described chimney. Other boreholes at the bottom of the oil shale zone may be drilled to act as production boreholes. However, the injection and production boreholes may not be needed because of over extensive fracturing.

Fracture Creation

The greater the number of fractures, the greater the recovery efficiency because oil shale formations conduct heat very slowly. Thus, the closer the fractures are to each other the greater will be the oil and gas production rate and the greater the efficiency of heat conduction and the shorter the producing life of the project.

To create this fracturing program for a vertical fracture system, the large diameter vertical borehole or motherbore 12 is drilled and six substantially horizontally disposed boreholes, i.e. fracturing boreholes) 73, 74, 84, 86, 88, and 90, along with four connecting substantially horizontally disposed connecting boreholes 76, 78, 80, and 82, are drilled in the middle of a 220 foot thick oil shale zone as shown in FIG. 2.

The six substantially horizontally disposed boreholes 73, 74, 84, 86, 88, and 90, are drilled such that any vertical fractures created will be perpendicular to the direction of the least regional stress. Each of the substantially horizontally disposed boreholes 73, 74, 84, 86, 88, and 90, is cased with an uncemented casing which contains perforations in the same manner as the substantially horizontally disposed fracturing borehole 22 herein before described, and each of such substantially horizontally disposed fracturing boreholes is fractured separately with multiple fractures in each borehole.

A borehole orientation drilled to conform to a vertical azimuth is believed desirable even if the regional stresses favor a horizontal fracture. If the fracturing pressure is maintained above the fracturing pressure of a horizontal fracture, even if formed first, a vertical fracture will occur in the previously created horizontal fracture and afterwards a horizontal fracture in the previously created vertical fracture. In some situations a vertical fracture will occur in the original vertical fracture parallel to the least regional stresses if it is lower than the stresses in a horizontal fracture.

Figure 4:
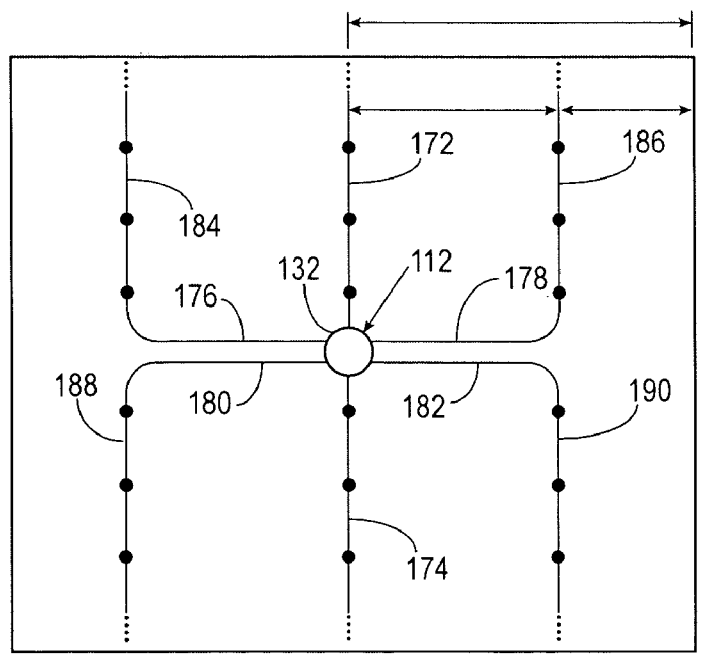
FIG. 4 is a pictorial representation of a 40 acre spacing for drilling and fracturing a subterranean formation.

For illustration purposes, assume the 40 acre spacing well 72 is drilled as shown in FIG. 2 and 4 ½ inch perforated, uncemented casing is run in the substantially horizontally disposed fracturing boreholes (also referred to hereinafter as boreholes) with the perforations spaced 30 feet apart. The perforations in each of the uncemented casings of the substantially horizontally disposed fracturing boreholes 73, 74, 84, 86, 88, and 90 are indicated in FIG. 2 by the numerals 92$a$, 92$b$, 92$c$, 92$d$, 92$e$ and 92$f$, respectively. If a single borehole is fractured separately, each borehole will contain 20 separate sets of perforations. By use of a packer set halfway down the borehole (see FIG. 1), 10 sets of perforations can be treated simultaneously.

If the injection rate is 100 barrels of liquid nitrogen per minute (BPM) each ½ length borehole would fracture at 50 BPM rate or 5 BPM per separate fracture.

At −75° Fahrenheit, this rate after vaporization expands 14 fold to an equivalent rate of 70 BPM. Although this is a very high rate, a method of fracturing and repressuring subsurface geological formations employing liquified gas which may be employed is disclosed in U.S. Pat. No. 3,822,747, the entire contents of which is incorporated herein. It should be noted that the above referenced method, does not depend on frictional pressures to create secondary fractures but rather the secondary fractures will be created by the expansion forces of the vaporizing nitrogen gases.

It will be shown later that a rate of 5 BPM of liquid nitrogen translates to 210 GPM. This volume will occupy the void space of a 220 foot ½ fracture in just 2 minutes of pumping. If the entire fracture is not created in 2 minutes, the result will be a build up in pressure well beyond the fracturing pressure and as a result numerous secondary horizontal and vertical fractures will be created.

For purposes of calculations, assume that 20 separate vertical ½ fractures 220 feet in length are created in a single borehole. This will result in a one "fold" volume of liquid nitrogen. In practice, secondary fractures will be occurring before the 220 foot extension is reached therefore more than one "fold" volume of liquid nitrogen will be required.

A one "fold" volume of liquid nitrogen "theoretically" would result in 20, 220 foot ½ fractures 30 feet apart. The injection of a 5 "fold" volume of nitrogen would result in the "equivalent" of 1200 ½ fractures averaging 6 feet apart. This is important for two reasons:

1. The fracturing of all six (6) boreholes in a 40 acre spacing well may create the equivalent of 1,200 separate ½ fractures. In reality, the fracture system consists of vertical fractures perpendicular to each other both with and against the regional stresses and also the horizontal fractures. This occurs because the injection pressure can be maintained at 2000 to 3000 psi, well above the fracturing pressure of 500 psi.

The fracturing system is not confined to 220 foot fractures. Some fractures will extend into adjacent producing units. However, upon their treatment an equivalent number of fractures will occur in the first units. As a result of all this "cross fracturing" and the creation of 1,200, ½ fractures, the regional stresses overburden pressure can be nullified so that closure of the fractures does not occur.

2. The creation of 1,200, ½ length fractures result in each fracture being the equivalent of six (6) feet apart. This means the combustion front will have to penetrate only three (3) feet to consume all the kerogen in a particular fracturing block. It also creates a very large surface area for the combustion front.

It is desirable that each of the six separate substantially horizontally disposed fracturing boreholes 73, 74, 84, 86, 88, and 90, be cased with 4½" inch casing. The farthest half of the casing strings having pre-perforated holes or perforations 92 grouped together and spaced 30 feet apart or 10 sets for ½ of the borehole. The 4½" casing is not cemented as the casing pressure will be so high (2000 to 3000 psi plus friction losses) that all perforated intervals will be fractured.

The closer half of the casing, which contain rotating sleeve assemblies, as herein before described with reference to FIG. 1, are spaced 30 feet apart. Each rotating sleeve assembly will contain sets of perforations along with a battery operated rotating sleeve. The rotating sleeve assemblies are run with the rotating sleeve covering the perforations.

A two-stage treatment can be performed by installing an open hole plug catcher midway down the casing string to separate the farthest 10 sets of perforations from the closer sliding sleeve assemblies as herein before described with reference to FIG. 1.

When a fractured treatment commences, the rotating sleeve assemblies are closed and all of the fracture treatment goes into the farthest set of perforations 92 in one of the substantially horizontally disposed fracturing boreholes, such as the borehole 72. Also in the midway point is a "plug catcher". After the first sets of perforations 92 are treated, a casing plug is pumped down the hole and seats in the "plug catcher". While being pumped down the hole, the "casing plug", which also contains a radio transmitter, will activate the battery operated rotating sleeves and the sleeves will rotate and open the upper sets of perforations. With the casing plug in place the upper sets of perforations can be treated. This procedure is repeated for each borehole separately.

A packer is set below the plug catcher to prevent fluids from entering the previously fractured perforations which is at a lower pressure than the breakdown pressure of the upper set of perforations.

The rotating sleeves are pre-perforated with four (4) 1 inch holes approximately 2 inches apart on one side and four (4) holes on the other. This arrangement requires that the rotating sleeves be rotated only 3 inches to open.

Larger Spacing Units

Because of the mountainous terrain it may be necessary to drill certain wells on spacing units greater than 40 acres. Also, field operations may indicate the feasibility of a larger spacing on a nominal basis. The drilling of additional connecting boreholes can be made to the 40 acre spacing well illustrated in FIG. 2. This will allow the drilling of another fracturing borehole parallel to the original off well fracturing borehole at another 440 feet distance. Doing this and extending all fracturing boreholes to a distance of 1100 feet as compared to 660 feet for a 40 acre well will increase the unit spacing to 111 acres.

Further, the drilling of a third fracturing borehole would extend the fracturing borehole to 1540 feet and the unit spacing to 217 acres. Since each borehole will be fractured separately, the fracturing of these additional boreholes will be similar to what has been described for 40 acre spacing except for additional stages required for the added borehole length.

The injection boreholes will be extended from 660 feet at 40 acres to 1100 feet for 111 acres and 1540 feet for 217 acre spacing. The extended injection distance for combustion gases will be more than compensated for by running one or two strings of tubing with packers and utilizing the annulus to separate injection intervals to less than that in a 40 acre well.

In very mountainous territory it will be impossible to drill straight down with a "motherbore" hole. In such cases a long inclined and horizontal borehole can be drilled to a point above the oil shale zone before diverting to a vertical "motherbore" hole.

Methods of Heat Conduction

There are several methods available which can be applied to conduct heat to the oil shale kerogen, such as steam injection, air injection for direct combustion or injection of pure oxygen for direct combustion. However, a preferred method utilizes injection of pure oxygen for direct combustion for the following reasons:

1. The oil and gas production rate is directly a function of the rate of combustion of the oil shale. Comparing air to oxygen injection, air injection would require almost 5 times as much volume of injection as pure oxygen for a given production rate. Because of this large ratio of injection, oxygen injection would require fewer wells to obtain the same rate of production.

2. The cost to provide 71,000,000 SCFD of air compression compared to a 15,000,000 SCFD on-site oxygen plant would be 25% to 50% higher. In addition, the operating cost for air compression would be considerably higher. Further, the air emissions from the compressors would far exceed those from an on-site oxygen plant which is largely electric driven.
3. The flue gas emissions from air combustion is a serious and costly problem as compared to combustion with pure oxygen. It would also be far easier and less costly to reclaim the methane produced in the oil shale process for generation of electricity which would be needed as fuel in the liquid nitrogen and liquid oxygen on-site plants and for other fuel use.
4. Other possible advantages for oxygen over air are the increased production of hydrogen needed for refinery upgrading of the raw oil shale and possibly a lower pour point of the oil.
5. The use of pure oxygen in the combustion process would assure a better rate of combustion and a more sustainable burn front as compared to air.
6. Because of the danger of corrosion using air or oxygen for combustion, it is recommended that all tubulars be made from high pressure aluminum or coated steel. The larger casing size may pose a problem because these sizes are probably not manufactured, but could be. In that event a coating on the casings may suffice.

Production Rate

As 28 gal. per ton oil shale requires approximately 1630 SCF of pure oxygen for combustion to generate one barrel of raw oil but this is reduced to 1086 SCF/bbl, by preheating the injected oxygen. The pre-heating is done by heat exchanging the oxygen with the hot produced oil, gas, water and combustion gases. If an on site oxygen plant had a capacity of 15,000,000 SCFD, the production rate would be approximately 13,812 BOPD and a gas production rate of 27,624 millions of BTU's. If this volume of nitrogen is injected into 4 separate wells, the average production rate per well would be over 3000 BOPD and 6,000 millions of BTU's of gas.

Based on an injection rate of 3,750,000 SCFD it is believed that a spacing of 40 acres would be an optimum well density.

The above calculations are based on a rate of combustion and subsequent production rate resulting from the combustion. Not included in the additional production rate resulting from the migration of very hot oil vapors, is hot natural gas and combustion gases that heat up the fracture faces downstream of the combustion front.

Generation of Liquid Nitrogen

As shown hereinafter, the cost to generate a gallon of liquid nitrogen is approximately 16 cents per gallon. This cost is based on $40 per ton for a 544 ton plant or $21,760 per day. The plant would require one (1) 1,000 Kw/hr or $10,560 per day of electricity or nearly one half the daily operating costs. Since the oil shale process will produce approximately 2,000,000 BTU's of fuel for each barrel of produced oil, excess fuel will be available to produce on-site electricity which will substantially reduce the indicated 4 cents/Kw-h cost of plant electricity.

Also included in the cost estimate of $40 per ton is a 39% corporate income tax which would not apply to the direct cost. Therefore the estimated direct cost of generating on-site liquid nitrogen could be approximately 10 cents per gallon if electricity is generated for production gases. For a 40 acre well requiring 400,000 gallons of liquid nitrogen the cost of the liquid nitrogen @ 16 cents per gallon would be approximately $64,000.

Calculation of Production Rate

Approximately 260 BTU's per lb. of raw shale are required to raise a pound of 28 g/t shale to 900° Fahrenheit (Ref 2).
Required BTU's per ton=2000×260=520,000 BTU's
Barrels of oil in ton=28/42=0.67 bbls.
Required BTU's per barrel of oil=520,000/0.67=776,119 BTU's
One SCF of air liberates 100 BTU's (Ref 3).
SCF of air required to produce one bbl. of oil=776,119/100=7,761 SCF/bbl.
SCF of oxygen required=SCF of air×21% oxygen=7,761×0.21=1630 SCF oxygen/bbl oil.
Oil production from 15,000,000 SCF oxygen plant=15,000,000/1630=9209 bbls. oil per day.

If injected oxygen is heat exchanged with the hot water, oil and gases of production, the heat generated in the process would transfer to the raw shale in addition to the heat of combustion. This would reduce the oxygen need by at least ⅓ to 1086 SCF/bbl.

Oil production from 15 million SCF oxygen plant=13,812 BOPD. The plant capacity could be injected into 4 wells.

Calculation of Required Liquid Nitrogen

Assume for a 40 acre spacing well (See FIG. No. 1) the creation of 6 separate horizontal fracturing boreholes 73, 74, 84, 86, 88, and 90, with an initial vertical fracture being created every 30 feet in each borehole.

As seen in FIG. 2, each ½ length "major" fracture would extend 220 feet before linking up with the ½ length fracture of the adjoining borehole, and it is assumed each fracture would be 220 feet in height.

Therefore:

$$\frac{(220 \text{ feet})(220 \text{ feet})(0.2 \text{ inch})}{12 \text{ in/ft}} =$$

806 cubic feet of void space per single 1/2 length fracture.

The volume of liquid nitrogen required after vaporizing at fracturing pressure of 500 psi is as follows:

A SCF of liquid nitrogen will expand to 20.07 cubic feet (see attached tables of Isometric Properties of Nitrogen from NIST) assuming an injection pressure of the liquid nitrogen of 500 psia and −140° R (−320° F.) to 520° R (60° F.) temperature change.

A gallon of liquid nitrogen after vaporization would occupy 2.68 cubic feet @ 500 psia $$\frac{20.07 \text{ ft}^3}{7.48 \text{ g/ft}^3}$$

Therefore one single ½ fracture length would require 301 gallons nitrogen $$\frac{806}{2.68} \text{ of liquid nitrogen}$$

Since it is desirable to create numerous secondary, cross-hatched fractures, additional liquid nitrogen is needed to create secondary fractures. The initial 301 gallons of liquid nitrogen needed to create a "major" fracture is hereby referred to as one "fold" volume. A 5 "fold" volume is recommended to reverse the effects of fracture healing and to decrease the distance the combustion front must travel in each fracture block.

A one "fold" treatment would result in major fractures occurring every 30 feet. A 5 "fold" treatment would create the equivalent of a "major" fracture every 6 feet which would require the combustion front to advance only 3 feet for complete combustion for each block.

In actual practice at least one "major" fracture of 220 foot length would be created and numerous "cross-hatched" vertical and horizontal fractures would occur; however, a 5 "fold" treatment would be the equivalent of 6 "major" fractures.

As to the total volume of liquid nitrogen required consider: 6, ½ fractures to connect clear across a 40 acre spacing unit (1 320 feet)(6 fractures)(301 gal/fracture)=1806 gals. of liquid nitrogen with "connecting" fractures running every 30 feet a total of 40 would result.

Therefore: (40)(1806)=72,240 gals/"fold" at 5 "folds"
(73,240 gals)(5)=361,200 gal of liquid nitrogen.

Since each gallon of liquid nitrogen can be produced at about 16 cents per gallon additional "fold" would only cost $11,558 each, however, 5 "folds" should be sufficient unless field experience indicates an increase in recoverable reserves would result from increased fracturing or the healing of fractures would be prevented.

The parameters herein before described the successful in-situ production of oil shale are "off the shelf" procedures; that is, liquefaction, nitrogen, and vaporization of liquid nitrogen, horizontal drilling, in-site combustion of hydrocarbons, treatment of produced water and flux gas and refining upgrading.

The successful production of oil shale is the creation of hundreds of vertical and horizontal, cross-hatched fractures which will allow a vast surface area for the heating of oil shale kerogen and alleviate the need to prop open the fractures created. If 1200+ fractures are created in a 40 acre well this should prevent the healing of cross-hatched fractures. If not, the pressure necessary to inject combustion gases and the expansion of water to steam will hold open the fractures. But equally important is the creation of the fractures by vaporizing large volumes of liquid nitrogen which will create very large "expansion pressures" well in excess of regional fracture stresses. The creation of 1200 or more fractures will also.

Although the in-situ production of oil shale will have many treating problems such as low pour point of oil, water treating, flux gas treating and up-grading before refining, these problems and costs appear to be less than those associated with athabasca oil sands and tar sands in Canada which are being produced at a profit and at increasingly large volumes.

Although a single 40 acre spacing well, 220 feet in thickness has been described, it should be understood that as many as 6 wells can be drilled on a 40 acre unit with approximately 1500 feet of oil shale thickness with 4 of those wells being drilled concurrently using countercurrent flow in two of the wells. This could result in the possible recovery of 100,000,000 barrels of oil equivalent (BOE) and a potential profit of $1,000,000,000 per 40 acre location.

Gas Hydrates (Methane) are sources of methane and in some cases heavier hydrocarbons, that are present in vast areas of continental ocean slopes deep enough to cause freezing. They are also present in some areas of the Arctic and can be several thousand feet thick.

These gas hydrates and associated water are frozen in place and exist in huge volumes that well exceed all other forms of carbon existing in oil, gas, oil shale and coal reserves. They exist worldwide and represent a very valuable energy source for the future. Since a unit of gas hydrate in place can contain as much as 160 units at standard conditions, their exploitation can change the world's energy future.

Gas hydrates are gas molecules surrounded by water molecules in a cage-like lattice network existing in a permafrost area or in continental ocean slopes deep enough to cause freezing. Like oil shales, these gas hydrates in place are solid with little or no permeability and must be heated to cause this dissociation.

To accomplish in-situ production of gas hydrates, it is necessary to heat the hydrates to cause dissociation. Thus, heated water or steam is injected into a multiple fracture system 110 so that the dissociated gases can travel through the multiple fracture system 110 and into a vertical borehole 112 (via the mother borehole) whereby the gas is delivered to the surface 114 and recovered in a conventional manner.

The utilization of steam or heated water is important because water can replace the void spaces created by dissociation of the gas hydrate and the shrinking of the hydrate ice and prevent possibly slumping of the hydrate beds.

Figure 3:
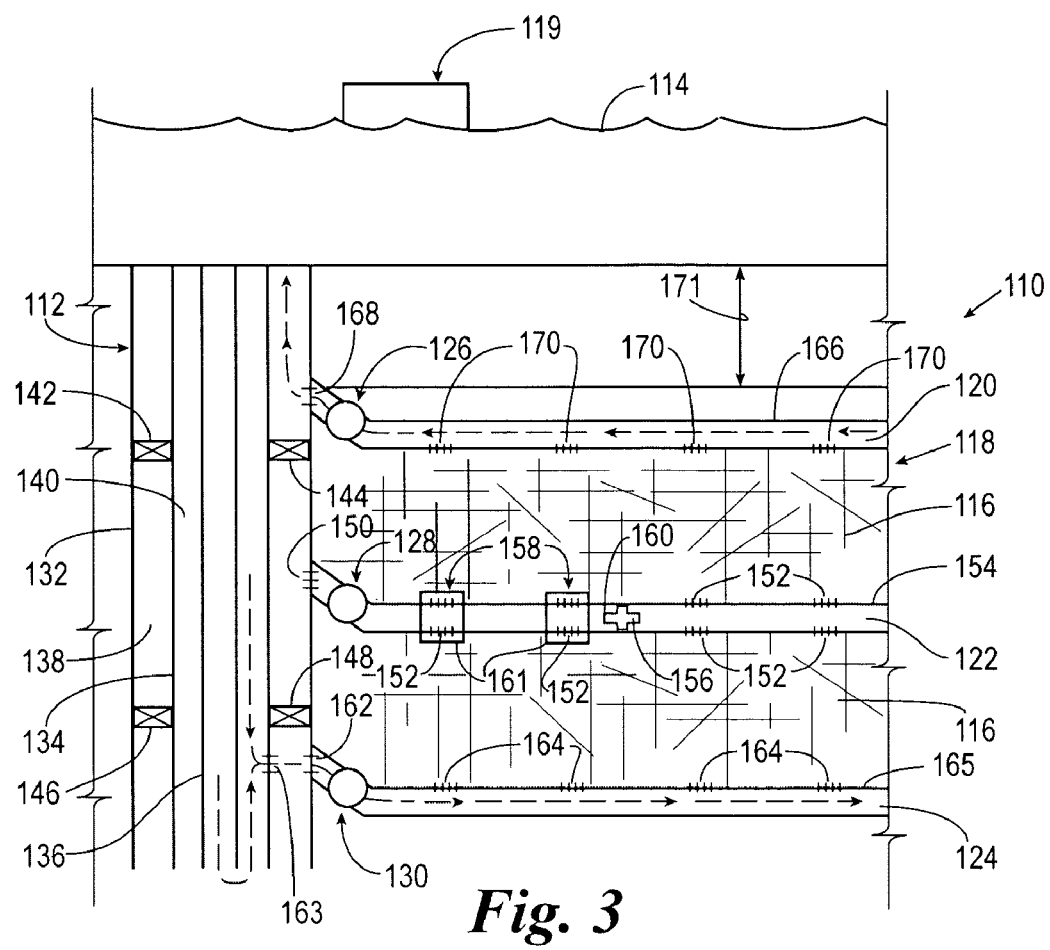
FIG. 3 is a pictorial representation of a fractured formation containing gas hydrates wherein the formation has been fractured in accordance with the present invention.

As shown in FIG. 3, the method of forming fractures 116 in a hydrate formation 118 to recover disassociated gas from the hydrate formation 118 includes providing the substantially vertically disposed borehole 112, a lightweight drilling barge 119 containing an air drilling rig, liquid nitrogen plant and associated cryogenic storage tanks, and a plurality of substantially horizontally disposed boreholes 120, 122 and 124, extending outwardly from the vertically disposed borehole 112. The multiple fracture system 110, further includes conventional production equipment (not shown) which is associated with the vertically disposed borehole 112 for the recovery of gases recovered due to disassociation of the gas hydrates. The vertically disposed borehole 112 and the substantially horizontally disposed boreholes 120, 122 and 124 are similar to the vertically disposed borehole 12 and the plurality of substantially horizontally disposed boreholes 20, 22 and 24, hereinbefore discussed with reference to the method for forming fractures in the oil shale formation 18 to recover oil shale oil and gases from the oil shale formation heretofore described with reference to FIG. 1, except in the method for recovering gas from gas hydrates, the production borehole is preferably the substantially horizontally disposed borehole 120 and the injection borehole is the substantially horizontally disposed borehole 124. However, it should be understood that the production borehole can be the lower most borehole such as heretofore described with reference to FIG. 1.

That is, the uppermost substantially horizontally disposed borehole 120 is a production borehole, the intermediate substantially horizontally disposed borehole 122 is a fracturing borehole and the lower most substantially horizontally disposed borehole 124 is an injection borehole. However, it should be understood that the location of the production borehole and the injection borehole can be reversed so that such boreholes are positioned relative to the fracturing borehole 122 in the same manner as hereinbefore described with reference to FIG. 1.

Except for the location of the production borehole 120 relative to the injection borehole 124 of the multiple fracturing system 110, the multiple fracturing system 110 is similar in construction and function to that heretofore described with reference to the multiple fracturing system 10. That is, each of the substantially horizontally disposed boreholes 120, 122 and 124, is provided with a remotely controlled valve assemblies 126, 128 and 130, respectively, so that the substantially horizontally disposed boreholes 120, 122 and 124, can be closed off from the vertically disposed borehole 112 or selectively opened to provide fluid communication between selected substantially horizontally disposed boreholes 120, 122 and 124 and the vertically extending borehole 112.

Drilling Method Off-Shore Well

It is believed desirable to drill off-shore gas hydrates wells utilizing the light weight drilling barge 119 containing an air drilling rig, a liquid nitrogen plant and associated cryogenic storage tanks.

A serious problem exists in drilling into gas hydrate zones because the heat of drilling fluids warms the hydrates near the wellbore, dissociating them and creating craters and sinkholes against the casing wellbore. To avoid this, it is believed desirable to employ a cryogenic drilling method disclosed in U.S. Pat. No. 3,612,192 entitled "Cryogenic Drilling Method", the entire contents of which is expressly incorporated herein by reference.

In process disclosed in U.S. Pat. No. 3,612,192, high pressure air is passed through a turbo-expander and exited at a much lower pressure and in the process can lower the temperature of the air to as low as −200° F. Such a process is used extensively in gas processing plants.

By drilling with cryogenic air in conjunction with an electric driven downhole motor, the bit can be rotated many times faster than normal air drilling because of the bit being cooled by cryogenic temperatures near −200° F. The results will be vastly increased penetration rates. It may be desirable to augment the turbo-expander temperature with partial injection of liquid nitrogen to lower the temperature below −200° F.

To prevent possible slumping of gas hydrate beds after their exploitation, it is believed desirable that adjacent acreage be left alone so that if slumping occurs in one 40 acres unit it will encounter a frozen undisturbed unit and slumps no further.

Prior to fracturing the formation, the vertically disposed borehole 112 is provided with a cemented outer casing 132. After fracturing, a medium or inner casing 134 is disposed within the cemented outer casing 132 and lowered to the bottom and tubing 136 is disposed within the medium casing 134. A first annulus 138 is formed between the cemented outer casing 132 and the medium or inner casing 134; and a second annulus 140 is formed between the tubing 136 and the medium or inner casing 134. Packers 142, 144, 146 and 148 are selectively positioned within the first annulus 138 for closing off portions of the formation 118. Such a configuration permits fluid communications between the substantially horizontally disposed injection borehole 124 and the substantially horizontally disposed production borehole 120 via the fractures 116 formed in the formation 118. Further, by running the uncemented medium or inner casing 134, the tubing 136 and appropriate packers 142, 144, 146 and 148, heated gases, steam or the like, can be injected into the injection borehole 124 for disassociating the gas hydrate and permitting the gas disassociated therefrom to move upwardly through the fractures 116 and into the production borehole 120.

To fracture the formation 118 so that the disassociated gas can be recovered, the valve assemblies 126 and 130 associated with the substantially horizontally disposed production borehole 120 and the substantially horizontally disposed injection borehole 124, respectively, are closed and the remotely controlled valve assembly 128 associated with the substantially horizontally disposed fracturing borehole 122 is opened. In addition, the packers 146 and 148 are installed at a desired position in the first annulus 138 at a position below perforations 150 in the cemented outer casing 132 so that fluid communication can be established between the first annulus 138 and the substantially horizontally disposed fracturing borehole 122 when the remotely controlled valve assembly 130 is opened. Thereafter, an initial quantity of liquified gas is introduced into the substantially horizontally disposed fracturing borehole 122 whereby liquified gas is discharged into the formation 118 via perforations 152 provided at selected positions in a casing 154 surrounding the substantially horizontally disposed fracturing borehole 122. The casing 154 surrounding the substantially horizontally disposed fracturing borehole 122 is provided with a plug catcher 156 which is positioned at about the midpoint of the casing 154. A plurality of rotating sleeve assemblies 158, which are similar in construction and function to the rotating sleeve assemblies 58 hereinbefore described, are supported on the casing 154 for selectively opening and closing off the perforations 152 upstream of the plug catcher 156. When a fracture treatment commences, the rotating sleeve assemblies 158 are closed and the liquified gas goes to the furthermost set of or downstream perforations 152 in the casing 154. The initial quantity of liquified gas is allowed to vaporize in a portion of the substantially horizontally disposed fracturing boreholes 122 whereby a resulting increase in pressure in the substantially horizontally disposed borehole 122 forms the fractures 116 in the formation 118. Once the initial quantity of liquified gas has expanded and produced an initial network of fractures 116 in the formation 118, an additional quantity of liquified gas is introduced into the substantially horizontally disposed fracturing borehole 122. The additional quantity of liquified gas is allowed to vaporize in the fractures 116 in the formation 118 created by the injection of the initial quantity of liquified gas into the substantially horizontally disposed fracturing borehole 122 whereby a resulting increase in pressure in the substantially horizontally disposed fracturing borehole 122 forms additional fractures 116 in the formation 118 (i.e. a network of cross fractures).

After the first set of perforations 152 is treated, a casing plug 160 is pumped into the substantially horizontally disposed fracturing borehole 122 and seats in the plug catcher 156. While being pumped into the substantially horizontally disposed fracturing borehole 122, the casing plug 160, which contains a radio transmitter or other remote control device, activates the rotating sleeve assemblies 58.

As with the rotating sleeve assemblies 58 of the multiple fracture system 10 hereinbefore described with referenced to FIG. 1, each of the rotating sleeve assemblies 158 includes a rotating sleeve 161 which is perforated on opposite sides thereof such that upon rotation of the rotating sleeve 161 the perforations 152 upstream of the plug catcher 156 and the casing plug 160 are opened. As previously stated, remote control rotating sleeves are well known in the art as are remote control devices capable of activating such rotating sleeves.

Thus, no further description of such are believed necessary to prevent one skilled in the art to understand and practice the invention.

Once the formation 118 has been fractured by the introduction of the initial and additional quantities of liquified gas, the remotely controlled valve assembly 128 associated with the substantially horizontally disposed fracturing borehole 122 is closed and the remotely controlled valve assemblies 126 and 130 associated with the substantially horizontally disposed production borehole 120 and the substantially horizontally disposed injection borehole 124, respectively, are opened. Further, packers 146 and 148 are installed at a desired position in the first annulus 138 so that the packers 146 and 148 are positioned above perforations 162 in the cemented outer casing 132 and perforations 163 in the medium or inner casing 134 to provide fluid communication between the second annulus 140 and the substantially horizontally disposed injection borehole 124. Perforations 164 are also provided in a casing 165 of the substantially horizontally disposed injection borehole 124. Thus, heated gases, steam, and the like, can be introduced into the substantially horizontally disposed injection borehole 124 for movement upward through the fractures 116 of the fractured formation 118 to the substantially horizontally disposed production borehole 120.

Each of the substantially horizontally disposed injection borehole 124, the substantially horizontally disposed fracturing borehole 122, and the substantially horizontally disposed production borehole 120, is cased with casings 165, 154, and 166, respectively, but the casings 165, 154 and 166 of such substantially horizontally disposed boreholes 124, 122 and 120, are not cemented as is the outer casing 132 of the vertically disposed borehole 112. Perforations 162, 150 and 168 are provided in selected portions of the cemented outer casing 132 of the vertically disposed borehole 112 so that fluid communication can be established between the vertically disposed borehole 112 and each of the substantially horizontally disposed boreholes 124, 122, and 120 as shown in FIG. 3. In addition, the medium casing 134 is provided with perforations 163 so that fluid communication is established between the second annulus 140 and the substantially vertically disposed injection borehole 122 via perforations 162 in the cemented outer casing 132 and the perforations 163 in the inner casing 134 substantially as shown in FIG. 3.

Perforations 164, 152, and 170 are provided in the casings 165, 154 and 166, respectively, of each of the substantially horizontally disposed boreholes 124, 122, and 120. Thus, the introduction of the initial quantity of liquified gas and the additional quantity of liquified gas into the formation 118, as well as the network of fractures 116 thereby produced, is controlled by the position and number of perforations 152 present in the casing 154 of the substantially horizontally disposed fracturing borehole 122. Further, the use of the substantially horizontally disposed injection borehole 124, the substantially horizontally disposed fracturing borehole 122, and the substantially horizontally disposed production borehole 120, permit the creation of the multiple fractures 116 which enhance recovery of gas once the gas is disassociated from the gas hydrate.

When the multiple fracturing system 110 is provided with more than one substantially horizontally disposed injection borehole 124, more than one substantially horizontally disposed fracturing borehole 122, and more than one substantially horizontally disposed production borehole 120, the remotely controlled valve assemblies 130, 128 and 126 associated with each of such boreholes, is closed during introduction of the initial quantity and the additional quantity of the liquified gas except for the fracturing borehole 122 through which the liquified gas is being introduced to provide the desired network of fractures 116 in the hydrate formation 118. It should be noted that the multiple fracturing system 110 is designed to provide an effective amount of overburden formation 171 to ensure that the fractures 116 do not penetrate the surface, such as the ocean floor.

As with the production of oil shale oil to recover oil shale oil from a shale oil formation as hereinbefore described with reference to FIG. 2, a 40 acre spacing well can be drilled in the same manner as disclosed in FIG. 2 for the recovery of gas from a gas hydrate formation. In such instance, the same procedures hereinbefore described with reference to FIG. 2 and the 40 acre spacing well drilled into the oil shale zone will be carried out to form the 40 acre spacing for the gas hydrate zone. However, as hereinbefore described, in drilling into gas hydrate zones it is believed desirable to employ the cryogenic drilling method disclosed in U.S. Pat. No. 3,612,192 entitled, "Cryogenic Drilling Method" which is heretofore been incorporated in its entirety by reference.

With reference to FIG. 4, a method for drilling off-shore gas hydrate wells is illustrated. The vertically disposed borehole 112 is first drilled and cased with the cemented outer casing 132. The well 112 is drilled to provide at least 600 feet of overburden formation 171 above the top of the gas hydrate zone (FIG. 3) so that vertical fractures do not penetrate to the surface.

Then two additional boreholes 172 and 174 are drilled opposite each other from the vertically disposed borehole 112 in a direction perpendicular to the direction of the least regional stresses. Four other "connecting" boreholes 176, 178, 180 and 182 are drilled perpendicular to the first from the vertically disposed borehole 112 for a distance of 440 feet (for a 40 acre spacing) then from the end of these connecting boreholes four more ½ radius boreholes 184, 186, 188 and 190 are drilled parallel to the boreholes. All of these fracturing boreholes 184, 186, 188 and 190 are at the midpoint of a 220 foot section of gas hydrate.

Since each ½ fracture extends 220 feet horizontally to meet up with a ½ fracture of an adjoining borehole, it is believed that the vertical fracture will also extend 220 feet in height. In practice, the injection of volumes of liquid nitrogen beyond the necessity of creating 220 feet ½ length fractures will extend the fracturing deeper than 220 feet into the gas hydrate. In thicker sections (some gas hydrates are 2000 feet thick) it would be advantageous to drill additional wells to exploit the deeper sediments rather than to drill additional boreholes in the same well which would take years to heat. Each fracturing borehole is to be perforated in a number of separate intervals as hereinafter discussed.

Additional horizontal boreholes in the same configuration could be drilled at the bottom of the gas hydrate zone to inject heated water or steam. Other boreholes at the top of the gas hydrate zone could be drilled to act as production boreholes.

Optional 80 Acre Spacing

Drilling on 80 acre spacing is a viable option and will reduce the necessary drilling and thus the total cost. A possible disadvantage is the minimum major ½ length fracture would increase from 220 feet to 311 feet. A 41% increase.

Since the sudden vaporization of liquid nitrogen will result in a low level explosion, one would expect a tendency of fractures to occur in the earlier portion of the major fracture and the longer this fracture is, the more difficult it would appear to create fractures in an orderly manner.

Consider, however, that the fracture creation is a matter of breakdown pressure at a particular part of a fracture and this would be the controlling factor. That is, a weaker section would break down first even if it is a long way down a fracture.

Also, additional injection of nitrogen at pressures below fracturing pressure would propagate the fractures near the fracturing borehole to lengths that would exceed the 311 feet major fracture length.

An alternative to increase spacing units beyond 80 acres is to drill an additional fracturing borehole parallel to the original borehole. This will require a new connecting borehole and because of the longer length of the fracturing borehole, additional fracturing stages will be required.

Fracture Creation

The greater the number of fractures in the impermeable gas hydrate formation, the greater the recovery efficiency.

Gas hydrate formations can conduct heat very slowly so the closer the fractures are to each other the greater will be the gas hydrate production rate and the greater the efficiency of heat conduction and the shorter the producing life of the project.

To create a fracturing program for a vertical fracture system it is believed desirable to first drill a large diameter vertical "motherbore" hole as herein before stated and drill six horizontal "fracturing" boreholes from the "motherbore" hole as illustrated in FIG. 2 in the middle of a 220 foot thick gas hydrate zone and also four connecting horizontal boreholes to distribute the fracturing fluid.

The boreholes are drilled such that any vertical fractures created will be perpendicular to the direction of the least regional stress. Each borehole is fractured separately with multiple fractures in each borehole.

It is desirable that the borehole orientation drilled to conform to a vertical azimuth even if the regional stresses favor a horizontal fracture. If the fracturing pressure is maintained above the fracturing pressure of a horizontal fracture, even if formed first, a vertical fracture will occur in the previously created horizontal fracture and afterwards a horizontal fracture in the previously created vertical fracture.

In some situations a vertical fracture will occur in the original vertical fracture parallel to the least regional stresses if it is lower than the stresses in a horizontal fracture.

For illustration purposes, assume a 40 acre spacing well is drilled as shown in FIG. 2 and 4 ½ perforated, uncemented casing is run in the fracturing boreholes with the perforations spaced 30 feet apart. If a single borehole is fractured separately, each borehole would contain 20 separate sets of perforations. By use of a cased hole packer, set halfway down the borehole, 10 sets of perforations can be treated simultaneously.

If the injection rate is 100 barrels of liquid nitrogen per minute (BPM) each ½ length borehole would fracture at 50 BPM rate or 5 BPM per separate fracture.

At −75° Fahrenheit, this rate after vaporization at 1200 psia, would expand 5.59 fold to an equivalent rate of 28 BPM down each separate fracture. Although this is a very high rate, the "Maguire Process" does not depend on frictional pressures to create secondary fractures but rather the secondary fractures will be created by the expansion forces of the vaporizing nitrogen gases.

As hereinafter described, a rate of 5 BPM of liquid nitrogen translates to 210 GPM. This volume at 1200 psia pressure will occupy the void space of a 220 foot ½ fracture in just 4.32 minute of pumping. It is believed that the entire fracture is not created in 4.32 minutes and an additional 22 BPM is injected, the result of which is a build up in pressure well beyond the fracturing pressure, and as a result numerous secondary horizontal and vertical fractures will be created.

For purposes of calculations, assume that 20 separate vertical ½ fractures 220 feet in length are created in a single borehole. This will result in a one "fold" volume of liquid nitrogen.

In practice, secondary fractures occur before the 220 foot extension is reached. Therefore more than one "fold" volume of liquid nitrogen will be required.

A one "fold" volume of liquid nitrogen "theoretically" would result in 20,200 foot ½ fractures 30 feet apart. The injection of a 5 "fold" volume of nitrogen would result in the "equivalent" of 1200 ½ fractures averaging 6 feet apart. This is important for two reasons:

1. The fracturing of all 6 boreholes in a 40 acre spacing well creates the equivalent of 1,200 separate ½ fractures. In reality, the fracture system will consist of vertical fractures perpendicular to each other both with and against the regional stresses and also the horizontal fractures. This occurs because the injection pressure is maintained at 3500 to 5000 psi, well above the fracturing pressure of 1200 psi.

In particular, the fracturing system in practice will not be confined to 220 foot fractures. Some fractures will extend into adjacent producing units. However, upon their treatment an equivalent number of fractures will occur. As a result of all the "cross fracturing" and the creation of 1,200 ½ fractures, it is believed that the regional stresses and overburden pressure can be nullified so that closure of the fractures does not occur. If, however, closure does occur, the injection of the heated water or steam will keep open the fracture system and also the expansion of the heated hydrate water.

2. The creation of 1,200, ½ length fractures will result in each fracture being the equivalent of 6 feet apart. This means the heating front has to penetrate only 3 feet to consume all the gas hydrate in a particular fracturing block. It also creates a very large surface area for the heating front.

It is believed desirable that each of the six separate horizontal fracturing boreholes be cased with 4½ casing strings. The farthest half will have pre-perforated holes grouped together and spaced 30 feet apart or 10 sets for ½ of the borehole. The 4½ casing will not be cemented as the casing pressure will be so high (2000 to 3000 psi plus friction losses) that all perforated intervals will be fractured.

The closer half will contain rotating sleeve assemblies also spaced 30 feet apart. Each assembly will contain sets of perforations with a battery operated rotating sleeve. The assemblies are run with the rotating sleeve covering the perforations.

A two stage treatment can be performed by installing an open hole packer midway down the casing string to separate the farthest 10 sets of perforations from the closer rotating sleeve assemblies.

When a fractured treatment commences, the sliding sleeve assemblies are closed and all of the fracture treatment goes into the farthest set of perfs. Also in the midway point is a "plug catcher." After the first sets of perforations are treated, a casing plug is pumped down the hole and seats in the "plug catcher". While being pumped down the hole, the "casing plug" which also contains a radio transmitter will activate the battery operated rotating sleeves and the sleeves will rotate and open the upper sets of perforations. With the casing plug in place the upper sets of perforations can be treated. This procedure will be repeated for each borehole separately.

After treatment, the casing plug can be retrieved by fishing operations. The rotating sleeves will have four (4), one inch openings separated by 2 inches with another set of 4 on the opposite side of the sleeve. It will only be necessary to rotate the sleeves about 2 inches to open the perfs.

Instead of using radio controlled plugs, direct wireless control can be employed to actuate the small battery controlled electric motors.

Method of Heat Conduction

Heat necessary to dissociate the gas hydrates is supplied by injecting heated water down the insulated injection line going from the production barge to the subsea wellhead and thence down the gas hydrate zone as indicated in FIG. 3. The water would normally be converted to steam but because of the pressure remains fluid.

The utilization of water as the heating agent is important because the injection of the water will replace the void spaces created by the dissociation of the gas hydrate and the shrinking of the hydrate ice and will also prevent possible slumping of the hydrate beds.

After injection, the heated water will dissociate the gas hydrate and the gas will migrate downward through the created fracture system to the lower production borehole and into the casing annulus and thence to the surface.

The required heat to heat the water is supplied by combustion of produced gas to fuel steam generators. This would amount to approximately 10% of the produced gas including heat losses. These figures are based on pure methane which contain 911 BTU's per SCF.

It is believed desirable that the injection of hot water should occur into the top of the gas hydrate zone to permit the injected water to migrate downward so that no "old" water would steal heat from the "new" water being injected as would occur if injection was instigated from the lower zone.

The hydrostatic pressure and increased injection pressure, with a lower production borehole pressure would force the liberated gas to flow downward rather than upward from the buoyancy factor.

Calculation of Gas Production Rate

BTU's required to raise one SCF of injected water from 60° F. to 212° F. plus BTU's required to vaporize the water to saturated vapor or 100% quality steam.

$$\frac{(62.5 \#/SCF)(152° F.) +}{(6,25 \#/SCF)(970 BTU/\#)} = 9500 \ BTU/SCF + 60,625 \ BTU/SCF$$

$$= 70,125 \ BTU/SCF$$

$$= (70,125 \ BTU/SCF)(5.6 \ 1 \ SCF/\text{bbl})$$

$$= 393,401 \ BTU\text{'s}/\text{bbl injected}$$

BTU's to dissociate one SCF of gas hydrate from 28° F. to 38° F.:

$$(6,25 \# CF) \ (.5 \ specific \ heat)(10° F.)$$

$$(6.25 \#/SCF)(144 BTU/\#)$$

$$= 313 + 9000$$

$$= 9313 \ BTU/SCF (.5 \ specific \ heat)$$

Since only the BTU's required to offset the heat of fusion, and since a SCF of hydrate consists of 0.9 water and 0.1 methane, the total BTU's to dissociate a SCF of hydrate is:

(9313 BTU/SCF−313 BTU/SCF)(0.9)=8100 BTU/SCF of hydrate

Since each BTU/SCF of hydrate will release 160 SCF of produced gas then:

$$\frac{8100 BTU/SCF}{160 \ SCF/SCF \ of \ produced \ gas} = 50.63 \ BTU/SCF$$

For a production rate of 50,000,000 SCFD the required BTU's would be (50,000,000 SCFPD)(50.63 BTU/SCF) = 2,531,500,000 BTU/D Since each barrel of 100% quality steam contains 393,401 BTU/bbl, then the required injection rate would be:

$$\frac{2,531,500,000/D}{393,401 \ BTU/\text{bbl of injected water.}} = 6434 \ B/D$$

However, void spaces created by the produced gas and the shrinkage of the hydrate water could result in slumping of the gas hydrate zones particularly after sustained production.

To alleviate this problem, the volume of void spaces created by a production rate of 50,000,000 SCFD is as follows:

Since each SCF of hydrate releases 160 SCF of produced gas then:

$$\frac{50,000,000 \ SCF}{160 \ SCF/SCF} = 312,500 \ SCF \ of \ hydrate$$

Since each SCF of hydrate consists of 0.9 SCF of H$_2$O and 0.1 SCF of methane the void space created by the gas production is:

$$(312,500 \ SCF)(0.1 SCF) = 30,500 \ SCF$$

then:

$$\frac{30,500 \ SCF}{5.61 \ SCF/\text{bbl.}} = 5436 \ \text{bbl.}$$

The void space created by the shrinkage of the hydrate ice to water is (0.9)

$$(312,500 \ SCF) \div 5.61 \ SCF/\text{bbl.} = 5014 \ \text{bbl. of shrinkage.}$$

Total space = 5436 bbl.+5014 bbl. = 10,452 bbls. per day.

Since the heat required to produce 50,00,000 SCFD was 6434 B/D of 100% quality steam and the void space requirement is 10452 bbls. Then, 10,452 bbls. of 62% quality steam should be injected.

For higher rates of production appropriate increases in injection would be required. The actual rate of production would be increased above 50 MMSCF because of the vacuum effect of the hydrate water and injected water as they cool.

Although the production rate would be reduced by the loss of heat down the insulated flow line and insulated tubing, over time the heat retained in the hydrate water (212° F.) after dissociation of the gas (14% injected heat) would, after heat conduction to surrounding frozen hydrate molecules increase the production rate. This heat of retention would more than make up for the injection heat losses.

These production rates are based on gas hydrate zones occupying 100% of the sediments. This is necessary because there is great uncertainty at this time regarding total thickness and continuity of gas hydrate zones. It is expected, however, that early exploitation will be made in zones of high production rates.

Total Gas Reserves Per 40 Acre Well

An accurate estimation of hydrate gas reserves are difficult because of lack of knowledge of the hydrate continuity, thickness, hydrate concentration and porosity in various areas of the world.

Biogenic source hydrates which originate from the action of bacteria on carbon sediments contain nearly pure methane at about 911 BTU's per SCF. On the other hand, thermogenic source hydrates originate from conventional source gas deposits and thru structure or other means migrate upward until they encounter cold regions that result in the creation of gas hydrates.

These non-biogenic hydrates appear to be very prevalent in the Gulf of Mexico and therefore initial attempts to exploit them using the "Maguire Process" should be attempted here.

There are also indications that since these natural gases originate from conventional sources below the present hydrate zones, they also contain heavier hydrocarbons of $C_2$ thru $C_5$ and thus their BTU content could be 30% to 40% higher than the biogenic methane hydrates.

Realizing that reserves parameters are difficult to estimate, an attempt to do so will be made using reasonable numbers that would be consistent with a rich area of the Gulf of Mexico sediments.

These calculations are as follows:

(43,560 SCF/acre)(40 acres)(0.40 porosity)(330 feet thickness)=36,800,000 SCF per 40 acre location, 330 feet in thickness.

Where the hydrate reserves are perhaps 1000 feet thick, 3 separate wells could be drilled on a single 40 acre unit, increasing the reserves to approximately 100 billion SCF/40 acres.

On Shore—Gas Hydrate Wells

Gas hydrates located in the land based areas of the arctic, notably Russia, Canada, Norway and Alaska can be recovered in a manner similar to that described for ocean hydrates, except of course, it is much easier and less expensive to drill on land than at sea.

An immediate problem to exploitation is the present lack of a gas pipeline. One is now planned for the future and should not lag too far behind the large scale production of arctic hydrates.

The parameters hereinbefore described of the in-situ method of producing gas hydrates are "off the shelf" procedures, that is liquefaction, pumping and vaporization of liquid nitrogen, horizontal drilling, offshore drilling and production platforms.

The successful production of gas hydrates is the creation of cross-hatched vertical and horizontal fractures which will allow a vast surface area for the heating of gas hydrate lattice works. Equally important is the creation of these fractures by vaporizing large volumes of liquid nitrogen, which will create very large "expansion pressures" well in excess of regional fracture stresses.

The creation of perhaps 1,200, ½ length fractures in a 40 acre well has a high probability of preventing the closure of created fractures, but in any event the pressures necessary to inject steam for heating should hold open the fractures created.

The creation of 1,200, ½ length fractures would result in these fractures being the equivalent of 6 feet apart. It is possible that the injection of additional "folds" of liquid nitrogen causing even closer spacing of fractures would result in higher rates of recovery or to ensure that fractures will stay open.

The drilling of the horizontal borehole using cryogenic air is especially significant. The cooling of the bit with cryogenic temperatures will permit much faster bit rotation than normal and result in much faster penetration rates. The bit would be driven by a downhole electric motor whose power would be increased by the cryogenic temperatures.

Geothermal Wells

Geothermal areas where above normal heat is located near the surface are usually associated with volcanic areas.

In areas where geothermal wells are drilled, for instance, California, exist wet formations from which steam flows when penetrated by boreholes. This steam is usually contained in the pore spaces, that is porosity, of these formations. Their rate of flow is controlled by the porosity and permeability of the formations.

The method of fracturing disclosed herein could enhance this process by creating hundreds of cross-hatch fractures in a manner similar to that recommended for oil shale production.

In the geothermal process, all that would be necessary is to fracture the "wet" formations with liquid nitrogen and produce back the vaporized nitrogen in the fractures as rapidly as possible. "Wet" geothermal areas can be fractured and produced in a manner similar to that for gas shales and detailed below.

Because of the temperature disparity between liquid nitrogen and the steam temperature formations, the fracturing process would be more violent than would occur in the oil shale process. Accordingly smaller volumes of liquid nitrogen would be required.

By creating hundreds of fractures in a geothermal well as opposed to a single vertical borehole or limited horizontal boreholes, the production rate and possible recovery factor would be greatly increased.

Another type of geothermal area is referred to as "dry" areas. These are areas where the formations have little or no permeability. To extract the heat from these formations, it is proposed to fracture them in a manner similar to the method disclosed herein.

It is proposed to drill a well in a similar manner and inject water from the surface into the top of the chimney, allow the water to encounter the hot fracture faces, turn to steam and produce it in a manner similar to that for gas hydrate formations disclosed above.

In both areas, wet or dry, the steam will be utilized to create electricity.

To accomplish in-situ production of steam from a "dry" geothermal formation, it is necessary to inject water, such as sea water, brine, or fresh water, into a multiple fracture system 210 so that the steam created can travel through the multiple fracture system 210 and into a vertical borehole 212 (via the mother borehole) whereby the steam is delivered to the surface 214 and recovered in a conventional manner.

Figure 5:
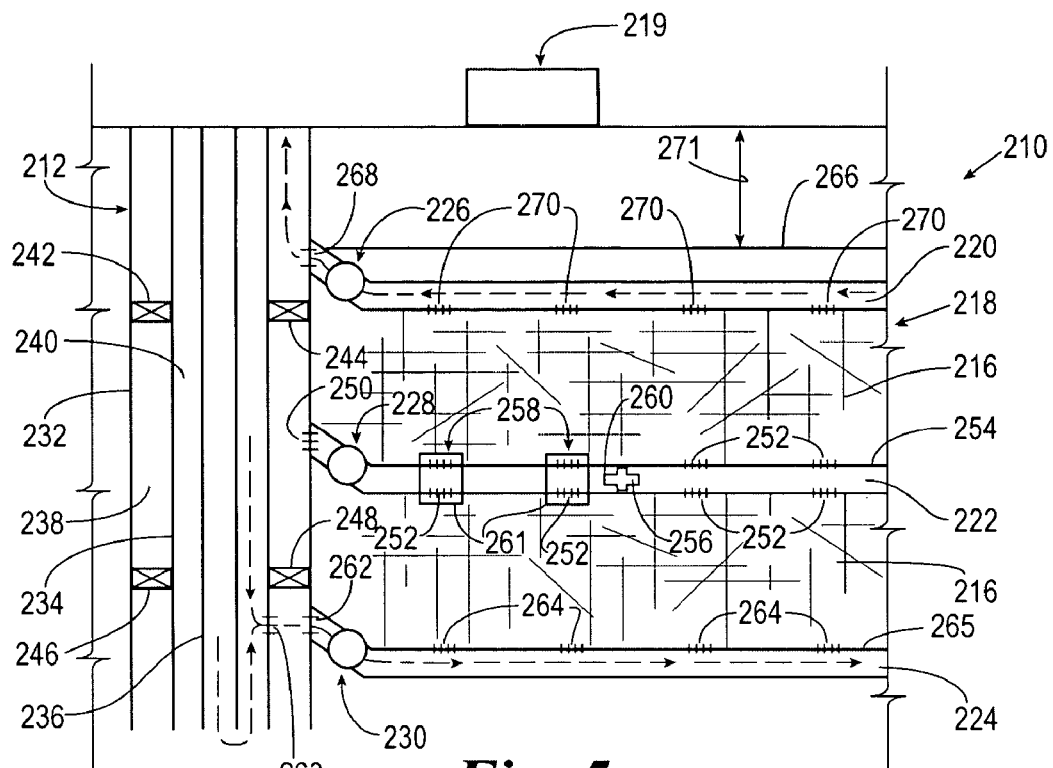
FIG. 5 is a pictorial representation of a fractured formation containing "dry" geothermal formations wherein the formation has been fractured in accordance with the present invention.

As shown in FIG. 5, the method of forming fractures 216 in a "dry" geothermal formation 218 to recover steam from the "dry" geothermal formation 218 includes providing the substantially vertically disposed borehole 212, a supply of liquefied gas 219 containing an air drilling rig, liquid nitrogen plant and associated cryogenic storage tanks, and a plurality of substantially horizontally disposed boreholes 220, 222 and 224, extending outwardly from the vertically disposed borehole 212. The multiple fracture system 210, further includes conventional production equipment (not shown) which is associated with the vertically disposed borehole 212 for the recovery of steam recovered due to water injected transforming into steam when contacted with the faces of the fractures. The vertically disposed borehole 212 and the substantially horizontally disposed boreholes 220, 222 and 224 are similar to the vertically disposed borehole 12 and the plurality of substantially horizontally disposed boreholes 20, 22 and 24, hereinbefore discussed with reference to the method for forming fractures in the oil shale formation 18 to recover oil shale oil and gases from the oil shale formation heretofore described with reference to FIG. 1, except in the method for recovering steam from "dry" geothermal formations, the production borehole is preferably the substantially horizontally disposed borehole 220 and the injection borehole is the substantially horizontally disposed borehole 224. However, it should be understood that the production borehole can be the lower most borehole such as heretofore described with reference to FIG. 1.

That is, the uppermost substantially horizontally disposed borehole 220 is a production borehole, the intermediate substantially horizontally disposed borehole 222 is a fracturing borehole and the lower most substantially horizontally disposed borehole 224 is an injection borehole. However, it should be understood that the location of the production borehole and the injection borehole can be reversed so that such boreholes are positioned relative to the fracturing borehole 222 in the same manner as hereinbefore described with reference to FIG. 1.

Except for the location of the production borehole 220 relative to the injection borehole 224 of the multiple fracturing system 210, the multiple fracturing system 210 is similar in construction and function to that heretofore described with reference to the multiple fracturing system 10. That is, each of the substantially horizontally disposed boreholes 220, 222 and 224, is provided with a remotely controlled valve assemblies 226, 228 and 230, respectively, so that the substantially horizontally disposed boreholes 220, 222 and 224, can be closed off from the vertically disposed borehole 212 or selectively opened to provide fluid communication between selected substantially horizontally disposed boreholes 220, 222 and 224 and the vertically extending borehole 212.

Prior to fracturing the formation, the vertically disposed borehole 212 is provided with a cemented outer casing 232. After fracturing, a medium or inner casing 234 is disposed within the cemented outer casing 232 and lowered to the bottom and tubing 236 is disposed within the medium casing 234. A first annulus 238 is formed between the cemented outer casing 232 and the medium or inner casing 234; and a second annulus 240 is formed between the tubing 236 and the medium or inner casing 234. Packers 242, 244, 246 and 248 are selectively positioned within the first annulus 238 for closing off portions of the formation 218. Such a configuration permits fluid communications between the substantially horizontally disposed injection borehole 224 and the substantially horizontally disposed production borehole 220 via the fractures 216 formed in the formation 218. Further, by running the uncemented medium or inner casing 234, the tubing 236 and appropriate packers 242, 244, 246 and 248, water, can be injected into the injection borehole 224 for contacting the fracture faces and permitting the generated steam to move upwardly through the fractures 216 and into the production borehole 220.

To fracture the formation 218 so that the generated steam can be recovered, the valve assemblies 226 and 230 associated with the substantially horizontally disposed production borehole 220 and the substantially horizontally disposed injection borehole 224, respectively, are closed and the remotely controlled valve assembly 228 associated with the substantially horizontally disposed fracturing borehole 222 is opened. In addition, the packers 246 and 248 are installed at a desired position in the first annulus 238 at a position below perforations 250 in the cemented outer casing 232 so that fluid communication can be established between the first annulus 238 and the substantially horizontally disposed fracturing borehole 222 when the remotely controlled valve assembly 230 is opened. Thereafter, an initial quantity of liquified gas is introduced into the substantially horizontally disposed fracturing borehole 222 whereby liquified gas is discharged into the formation 218 via perforations 252 provided at selected positions in a casing 254 surrounding the substantially horizontally disposed fracturing borehole 222. The casing 254 surrounding the substantially horizontally disposed fracturing borehole 222 is provided with a plug catcher 256 which is positioned at about the midpoint of the casing 254. A plurality of rotating sleeve assemblies 258, which are similar in construction and function to the rotating sleeve assemblies 58 hereinbefore described, are supported on the casing 254 for selectively opening and closing off the perforations 252 upstream of the plug catcher 256. When a fracture treatment commences, the rotating sleeve assemblies 258 are closed and the liquified gas goes to the furthermost set of or downstream perforations 252 in the casing 254. The initial quantity of liquified gas is allowed to vaporize in a portion of the substantially horizontally disposed fracturing boreholes 222 whereby a resulting increase in pressure in the substantially horizontally disposed borehole 222 forms the fractures 216 in the formation 218. Once the initial quantity of liquified gas has expanded and produced an initial network of fractures 216 in the formation 218, an additional quantity of liquified gas is introduced into the substantially horizontally disposed fracturing borehole 222. The additional quantity of liquified gas is allowed to vaporize in the fractures 216 in the formation 218 created by the injection of the initial quantity of liquified gas into the substantially horizontally disposed fracturing borehole 222 whereby a resulting increase in pressure in the substantially horizontally disposed fracturing borehole 222 forms additional fractures 216 in the formation 218 (i.e. a network of cross fractures).

After the first set of perforations 252 is treated, a casing plug 260 is pumped into the substantially horizontally disposed fracturing borehole 222 and seats in the plug catcher 256. While being pumped into the substantially horizontally disposed fracturing borehole 222, the casing plug 260, which contains a radio transmitter or other remote control device, activates the rotating sleeve assemblies 258.

As with the rotating sleeve assemblies 58 of the multiple fracture system 10 hereinbefore described with referenced to FIG. 1, each of the rotating sleeve assemblies 258 includes a rotating sleeve 261 which is perforated on opposite sides thereof such that upon rotation of the rotating sleeve 261 the perforations 252 upstream of the plug catcher 256 and the casing plug 260 are opened. As previously stated, remote control rotating sleeves are well known in the art as are remote control devices capable of activating such rotating sleeves.

Thus, no further description of such are believed necessary to prevent one skilled in the art to understand and practice the invention.

Once the formation 218 has been fractured by the introduction of the initial and additional quantities of liquified gas, the remotely controlled valve assembly 228 associated with the substantially horizontally disposed fracturing borehole 222 is closed and the remotely controlled valve assemblies 226 and 230 associated with the substantially horizontally disposed production borehole 220 and the substantially horizontally disposed injection borehole 224, respectively, are opened. Further, packers 246 and 248 are installed at a desired position in the first annulus 238 so that the packers 246 and 248 are positioned above perforations 262 in the cemented outer casing 232 and perforations 263 in the medium or inner casing 234 to provide fluid communication between the second annulus 240 and the substantially horizontally disposed injection borehole 224. Perforations 264 are also provided in a casing 265 of the substantially horizontally disposed injection borehole 224. Thus, water, can be introduced into the substantially horizontally disposed injection borehole 224 for movement upward through the fractures 216 of the fractured formation 218 to the substantially horizontally disposed production borehole 220.

Each of the substantially horizontally disposed injection borehole 224, the substantially horizontally disposed fracturing borehole 222, and the substantially horizontally disposed production borehole 220, is cased with casings 265, 254, and 266, respectively, but the casings 265, 254 and 266 of such substantially horizontally disposed boreholes 224, 222 and 220, are not cemented as is the outer casing 232 of the vertically disposed borehole 212. Perforations 262, 250 and 268 are provided in selected portions of the cemented outer casing 232 of the vertically disposed borehole 212 so that fluid communication can be established between the vertically disposed borehole 212 and each of the substantially horizontally disposed boreholes 224, 222, and 220 as shown in FIG. 3. In addition, the medium casing 234 is provided with perforations 263 so that fluid communication is established between the second annulus 240 and the substantially vertically disposed injection borehole 222 via perforations 262 in the cemented outer casing 232 and the perforations 263 in the inner casing 234 substantially as shown in FIG. 3.

Perforations 264, 252, and 270 are provided in the casings 265, 254 and 266, respectively, of each of the substantially horizontally disposed boreholes 224, 222, and 220. Thus, the introduction of the initial quantity of liquified gas and the additional quantity of liquified gas into the formation 218, as well as the network of fractures 216 thereby produced, is controlled by the position and number of perforations 252 present in the casing 254 of the substantially horizontally disposed fracturing borehole 222. Further, the use of the substantially horizontally disposed injection borehole 224, the substantially horizontally disposed fracturing borehole 222, and the substantially horizontally disposed production borehole 220, permit the creation of the multiple fractures 216 which enhance recovery of steam once the fracture faces are contacted with water and transformed to steam.

When the multiple fracturing system 210 is provided with more than one substantially horizontally disposed injection borehole 224, more than one substantially horizontally disposed fracturing borehole 222, and more than one substantially horizontally disposed production borehole 220, the remotely controlled valve assemblies 230, 228 and 226 associated with each of such boreholes, is closed during introduction of the initial quantity and the additional quantity of the liquified gas except for the fracturing borehole 222 through which the liquified gas is being introduced to provide the desired network of fractures 216 in the "dry" geothermal formation 218. It should be noted that the multiple fracturing system 210 is designed to provide an effective amount of overburden formation 271 to ensure that the fractures 216 do not penetrate the surface, such as the ocean floor.

As with the production of oil shale oil to recover oil shale oil from a shale oil formation as hereinbefore described with reference to FIG. 2, a 40 acre spacing well can be drilled in the same manner as disclosed in FIG. 2 for the recovery of steam from the "dry" geothermal formation 218. In such instance, the same procedures hereinbefore described with reference to FIG. 2 and the 40 acre spacing well drilled into the oil shale zone will be carried out to form the 40 acre spacing for the gas hydrate zone. However, as hereinbefore described, in drilling into "dry" geothermal areas it is believed desirable to employ the cryogenic drilling method disclosed in U.S. Pat. No. 3,612,192 entitled, "Cryogenic Drilling Method" which is heretofore been incorporated in its entirety by reference.

Gas Shale

Gas shale, also known as shale gas, is conventional natural gas that is produced from reservoirs predominantly composed of shale with lesser amounts of other fine grained rocks rather than from more conventional sandstone or limestone reservoirs. The gas shales are often both the source rocks and the reservoir for the natural gas, which can be stored in three ways:

a. adsorbed onto insoluble organic matter called kerogen
b. trapped in the pore spaces of the fine-grained sediments interbedded with the gas shale
c. confined in fractures within the shale itself Gas shales can be thick and laterally extensive. Drilling and production of gas shales in many cases is very similar to that for conventional natural gas reservoirs; however, due to lack of permeability, gas shales generally require fracture stimulation.

To accomplish in-situ production of gas from a gas shale and steam from a "wet" geothermal formation, it is unnecessary to inject water or steam into a multiple fracture system 310 for the gas from the gas shale and the steam from the "wet" geothermal formation can travel through the multiple fracture system 310 and into a vertical borehole 312 (via the mother borehole) whereby the gas from the gas shale and the steam from the "wet" geothermal formation can be delivered to the surface 314 and recovered in a conventional manner. The following method can be done for both producing gas from gas shales and producing steam from a "wet" geothermal formation. A formation 318 is depicted in FIG. 6, the formation 318 can be either a gas shale formation or a "wet" geothermal formation.

Figure 6:
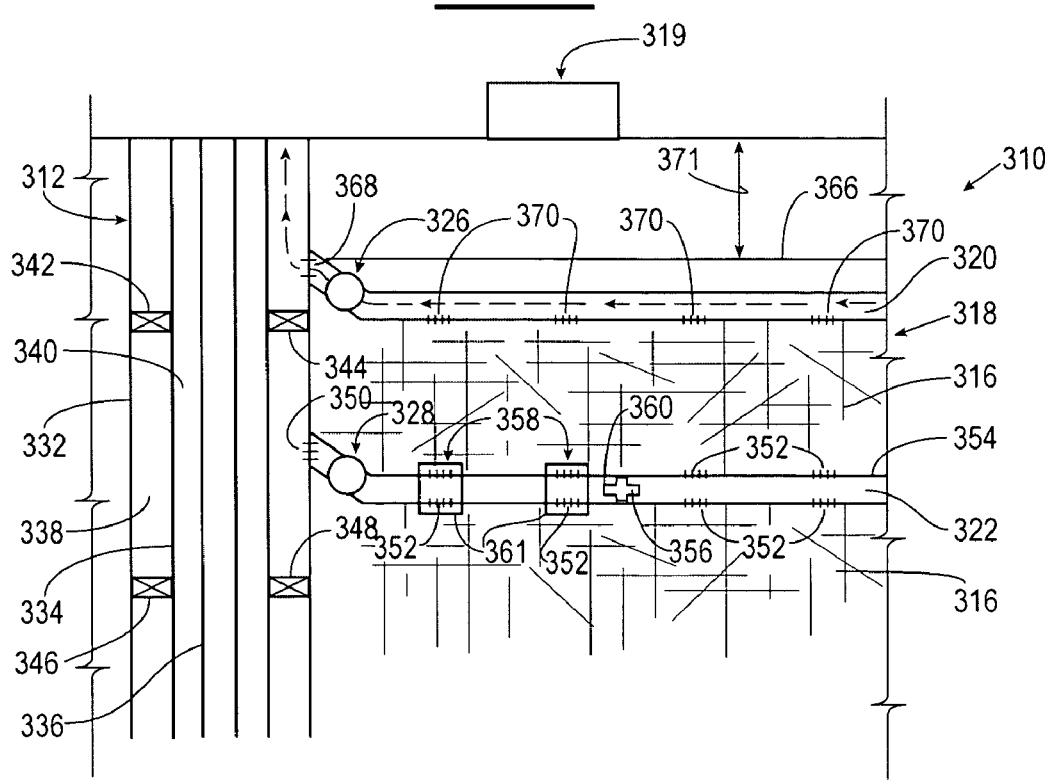
FIG. 6 is a pictorial representation of a fractured formation containing gas shale or "wet" geothermal formations wherein the formation has been fractured in accordance with the present invention.

As shown in FIG. 6, the method of forming fractures 316 in a formation 318 to recover gas or steam the formation 318 includes providing the substantially vertically disposed borehole 312, a supply of liquefied gas 319 containing an air drilling rig, liquid nitrogen plant and associated cryogenic storage tanks, and at least one substantially horizontally disposed boreholes 322, extending outwardly from the vertically disposed borehole 312. The multiple fracture system 310, further includes conventional production equipment (not shown) which is associated with the vertically disposed borehole 312 for the recovery of the gas or steam recovered from the formation 318. The vertically disposed borehole 312 and the substantially horizontally disposed borehole 320 is similar to the vertically disposed borehole 212 and the substantially horizontally disposed borehole 220, hereinbefore discussed with reference to the method for forming fractures in the "dry" geothermal formation 218 to recover the steam from the "dry" geothermal formation heretofore described with reference to FIG. 5, except in the method for recovering the gas or steam from the formations 318, a production borehole 322 is optionally and preferably a substantially horizontally disposed borehole 320. An injection borehole for gas shale and "wet" geothermal formations is not necessary. However, it should be understood that the production borehole can be the lower most borehole such as heretofore described with reference to FIG. 1.

That is, the upper substantially horizontally disposed borehole 320 is a production borehole, the lower substantially horizontally disposed borehole 322 is a fracturing borehole. However, it should be understood that the location of the production borehole and the fracturing borehole can be reversed.

Except for the location of the production borehole 320 relative to the fracturing borehole 322 of the multiple fracturing system 310, the multiple fracturing system 310 is similar in construction and function to that heretofore described with reference to the multiple fracturing system 10. That is, each of the substantially horizontally disposed boreholes 320 and 322, is provided with a remotely controlled valve assembly 326 and 328, respectively, so that the substantially horizontally disposed boreholes 320 and 322, can be closed off from the vertically disposed borehole 312 or selectively opened to provide fluid communication between selected substantially horizontally disposed boreholes 320 and 322 and the vertically extending borehole 312.

Prior to fracturing the formation, the vertically disposed borehole 312 can be provided with a cemented outer casing 332. After fracturing, a medium or inner casing 334 can be disposed within the cemented outer casing 332 and lowered to the bottom and tubing 336 can be disposed within the medium casing 334. A first annulus 338 can be formed between the cemented outer casing 332 and the medium or inner casing 334; and a second annulus 340 can be formed between the tubing 336 and the medium or inner casing 334. Packers 342, 344, 346 and 348 can be selectively positioned within the first annulus 338 for closing off portions of the formation 318. Such a configuration permits fluid communications between the substantially horizontally disposed fracturing borehole 322 and the substantially horizontally disposed production borehole 320 via the fractures 316 formed in the formation 318. Further, by running the uncemented medium or inner casing 334, the tubing 336 and appropriate packers 342, 344, 346 and 348, water, can be injected into the injection borehole 324 for contacting the fracture faces and permitting the gas or steam to move upwardly through the fractures 316 and into the production borehole 320.

To fracture the formation 318 so that the gas or steam can be recovered, the valve assembly 326 associated with the substantially horizontally disposed production borehole 320 is closed and the remotely controlled valve assembly 328 associated with the substantially horizontally disposed fracturing borehole 322 is opened. In addition, the packers 346 and 348 are installed at a desired position in the first annulus 338 at a position below perforations 350 in the cemented outer casing 332 so that fluid communication can be established between the first annulus 338 and the substantially horizontally disposed fracturing borehole 322 when the remotely controlled valve assembly 328 is opened. Thereafter, an initial quantity of liquified gas is introduced into the substantially horizontally disposed fracturing borehole 322 whereby liquified gas is discharged into the formation 318 via perforations 352 provided at selected positions in a casing 354 surrounding the substantially horizontally disposed fracturing borehole 322. The casing 354 surrounding the substantially horizontally disposed fracturing borehole 322 is provided with a plug catcher 356 which is positioned at about the midpoint of the casing 354. A plurality of rotating sleeve assemblies 358, which are similar in construction and function to the rotating sleeve assemblies 58 hereinbefore described, are supported on the casing 354 for selectively opening and closing off the perforations 352 upstream of the plug catcher 356. When a fracture treatment commences, the rotating sleeve assemblies 358 are closed and the liquified gas goes to the furthermost set of or downstream perforations 352 in the casing 354. The initial quantity of liquified gas is allowed to vaporize in a portion of the substantially horizontally disposed fracturing boreholes 322 whereby a resulting increase in pressure in the substantially horizontally disposed borehole 322 forms the fractures 316 in the formation 318. Once the initial quantity of liquified gas has expanded and produced an initial network of fractures 316 in the formation 318, an additional quantity of liquified gas is introduced into the substantially horizontally disposed fracturing borehole 322. The additional quantity of liquified gas is allowed to vaporize in the fractures 316 in the formation 318 created by the injection of the initial quantity of liquified gas into the substantially horizontally disposed fracturing borehole 322 whereby a resulting increase in pressure in the substantially horizontally disposed fracturing borehole 322 forms additional fractures 316 in the formation 318 (i.e. a network of cross fractures).

After the first set of perforations 352 is treated, a casing plug 360 is pumped into the substantially horizontally disposed fracturing borehole 322 and seats in the plug catcher 356. While being pumped into the substantially horizontally disposed fracturing borehole 322, the casing plug 360, which contains a radio transmitter or other remote control device, activates the rotating sleeve assemblies 358.

As with the rotating sleeve assemblies 58 of the multiple fracture system 10 hereinbefore described with referenced to FIG. 1, each of the rotating sleeve assemblies 358 includes a rotating sleeve 361 which is perforated on opposite sides thereof such that upon rotation of the rotating sleeve 361 the perforations 352 upstream of the plug catcher 356 and the casing plug 360 are opened. As previously stated, remote control rotating sleeves are well known in the art as are remote control devices capable of activating such rotating sleeves. Thus, no further description of such are believed necessary to prevent one skilled in the art to understand and practice the invention.

Once the formation 318 has been fractured by the introduction of the initial and additional quantities of liquified gas, the remotely controlled valve assembly 328 associated with the substantially horizontally disposed fracturing borehole 322 is closed and the remotely controlled valve assemblies 326 and 330 associated with the substantially horizontally disposed production borehole is opened. Thus, the gas and steam can then travel upward from the substantially horizontally disposed fracturing borehole 322 and through the fractures 316 of the fractured formation 318 to the substantially horizontally disposed production borehole 320.

Each of the substantially horizontally disposed fracturing borehole 322, and the substantially horizontally disposed production borehole 320, is cased with casings 354 and 366, respectively, but the casings 354 and 366 of such substantially horizontally disposed boreholes 322 and 320, are not cemented as is the outer casing 332 of the vertically disposed borehole 312. Perforations 350 and 368 are provided in selected portions of the cemented outer casing 332 of the vertically disposed borehole 312 so that fluid communication can be established between the vertically disposed borehole 312 and each of the substantially horizontally disposed boreholes 322, and 320 as shown in FIG. 6.

Perforations 352, and 370 are provided in the casings 354 and 366, respectively, of each of the substantially horizontally disposed boreholes 322 and 320. Thus, the introduction of the initial quantity of liquified gas and the additional quantity of liquified gas into the formation 318, as well as the network of fractures 316 thereby produced, is controlled by the position and number of perforations 352 present in the casing 354 of the substantially horizontally disposed fracturing borehole 322. Further, the substantially horizontally disposed fracturing borehole 322, and the substantially horizontally disposed production borehole 320, permit the creation of the multiple fractures 316 which enhance recovery of the gas and steam once the fracture faces are created and the gas and steam is released from the formation 318.

When the multiple fracturing system 310 is provided with more than one substantially horizontally disposed fracturing borehole 322, and more than one substantially horizontally disposed production borehole 320, the remotely controlled valve assemblies 328 and 326 associated with each of such boreholes, is closed during introduction of the initial quantity and the additional quantity of the liquified gas except for the fracturing borehole 322 through which the liquified gas is being introduced to provide the desired network of fractures 316 in the formation 318. It should be noted that the multiple fracturing system 310 is designed to provide an effective amount of overburden formation 371 to ensure that the fractures 316 do not penetrate the surface, such as the ocean floor.

As with the production of oil shale oil to recover oil shale oil from a shale oil formation as hereinbefore described with reference to FIG. 2, a 40 acre spacing well can be drilled in the same manner as disclosed in FIG. 2 for the recovery of gas and steam from the formation 318. In such instance, the same procedures hereinbefore described with reference to FIG. 2 and the 40 acre spacing well drilled into the oil shale zone will be carried out to form the 40 acre spacing for the gas hydrate zone. However, as hereinbefore described, in drilling into "dry" geothermal areas it is believed desirable to employ the cryogenic drilling method disclosed in U.S. Pat. No. 3,612,192 entitled, "Cryogenic Drilling Method" which is heretofore been incorporated in its entirety by reference.

Tar Sands and Heavy Oil Reserves

Tar sands in Canada and heavy oil reserves in Venezuela are successful operations. However, their cost and recovery efficiency can be greatly enhanced by use of this "Maguire Process."

Most of the tar sands production in Canada is done through surface mining and crushing. Some newer production is being done by drilling horizontal boreholes of less density than the "Maguire Process" with steam being injected into the borehole, heating the tar sands oil with the oil migrating to bottom through gravity.

The "Maguire Process" could greatly enhance this current process by drilling the horizontal borehole in a configuration similar to FIG. 1 and by fracturing in a manner identical to that described for oil shale development.

The net result is a much more extensive area for steam to heat up the sand oil and thus create much higher production rates and probably increased oil recovery.

It may be more practical to inject oxygen and ignite the tar sands as what the "Maguire Process" recommends for oil shale development.

Burning Coal Formations

Currently there are thousands of underground fires throughout the world. It is proposed to use the "Maguire Process" to eliminate these fires by drilling a vertical "motherbore" down past the bed of coals, drill horizontal boreholes as in FIG. 2 and then fracture these beds extensively using liquid nitrogen. The fracture system will distribute the vaporized nitrogen over a very extensive area and permit the injection of additional volume of normal temperature nitrogen to reduce or eliminate the oxygen needed to feed the coal fires.

What is claimed is:

1. A method of forming fractures in a subsurface formation having a substantially vertical borehole, at least one substantially horizontal fracturing borehole selectively in fluid communication with the substantially vertical borehole, at least one substantially horizontal injection borehole selectively in fluid communication with the substantially vertical borehole, and at least one substantially horizontal production borehole selectively in fluid communication with the substantially vertical borehole, wherein the substantially horizontal boreholes are spaced apart from one another, the method comprising the steps of:

preventing substantial fluid communication between the substantially vertical borehole and each of the at least one substantially horizontal injection borehole and the at least one substantially horizontal production borehole;

permitting substantial fluid communication between the substantially vertical borehole and the at least one substantially horizontal fracturing borehole;

providing an initial quantity of liquified gas into the at least one substantially horizontal fracturing borehole such that the liquified gas communicates with the formation; and allowing the initial quantity of liquified gas to vaporize in a portion of the at least one substantially horizontal fracturing borehole whereby a resulting increase in pressure in the at least one fracturing borehole forms fractures in a portion of the formation.

2. The method of claim 1 further comprising the steps of:
providing an additional quantity of liquified gas into the at least one substantially horizontal fracturing borehole; and
allowing the additional quantity of liquified gas to vaporize in the at least one substantially horizontal fracturing borehole whereby a resulting increase in pressure in the at least one substantially horizontal fracturing borehole forms additional fractures thereby creating a network of fractures in the formation such that the substantially horizontal boreholes are in fluid communication with one another.

3. The method of claim 2 wherein the initial quantity of liquified gas and the additional quantity of liquified gas are each injected at a pressure of at least about 500 psi.

4. The method of claim 3 wherein the injection rate of the initial quantity of liquified gas and the additional quantity of liquified gas is about 5 barrels per minute for a period of time of about 2 minutes.

5. The method of claim 2 further comprising the steps of:
preventing substantial fluid communication between the substantially vertical borehole and the at least one substantially horizontal fracturing borehole; and
permitting substantial fluid communication between the substantially vertical borehole and each of the at least one substantially horizontal injection borehole and the at least one substantially horizontal production borehole.

6. The method of claim 5 wherein the subsurface formation includes a dry geothermal formation and the at least one substantially horizontal production borehole is disposed above the at least one substantially horizontal fracturing borehole, and the at least one substantially horizontal fracturing borehole is disposed above the at least one substantially horizontal injection borehole.

7. The method of claim 5 further including the step of:
providing water into the network of fractures via the at least one substantially horizontal injection borehole whereby the water is transformed into steam when the water contacts the formation via the network of fractures.

8. The method of claim 2 wherein the at least one substantially horizontal fracturing borehole comprises a plurality of substantially horizontal fracturing boreholes spaced apart from one another and from the at least one substantially horizontal injection borehole and the at least one substantially horizontal production borehole, wherein the initial quantity of liquified gas injected into the plurality of substantially horizontal fracturing boreholes is an amount sufficient to fracture the formation at least about one half the distance between adjacent substantially horizontal boreholes, and wherein the additional quantity of liquified gas injected into the plurality of fracturing boreholes is an amount sufficient to fracture the formation the remaining distance between adjacent substantially horizontal boreholes.

9. The method of claim 1, wherein the subsurface formation includes a gas shale.

10. The method of claim 1, wherein the subsurface formation includes a wet geothermal formation.

11. A method for in-situ production of hydrocarbons from subterranean formations comprising:
providing a substantially vertical borehole;
providing at least one substantially horizontal fracturing borehole in fluid communication with the substantially vertical borehole, the at least one substantially horizontal fracturing borehole disposed a distance below an upper surface of the ground whereby upon fracturing a formation the fractures terminate a distance from the upper surface of the ground; and
providing at least one substantially horizontal injection borehole in fluid communication with the substantially vertical borehole, and at least one substantially horizontal production borehole in fluid communication with the substantially vertical borehole, wherein the substantially horizontal injection and production boreholes are spaced apart from one another and from the substantially horizontal fracturing borehole;
providing remotely controlled valves between the substantially vertical borehole and each of at least a portion of the at least one fracturing borehole, at least a portion of the at least one injection borehole, and at least a portion of the at least one production borehole;
actuating at least one of the remotely controlled valves to substantially prevent fluid communication between the substantially vertical borehole and each of the at least one substantially horizontal injection borehole and the at least one substantially horizontal production borehole;
actuating at least one of the remotely controlled valves to substantially permit fluid communication between the substantially vertical borehole and the at least one substantially horizontal fracturing borehole;
providing a quantity of liquified gas into the at least one substantially horizontal fracturing borehole at a rate and quantity sufficient to fracture the formation in a plurality of directions such that at least a portion of the formation is placed in fluid communication with the at least one substantially horizontal fracturing borehole.

12. The method of claim 11 wherein, in the step of providing a quantity of liquified gas into the at least one substantially horizontal fracturing borehole, the method further comprises:
providing an additional quantity of liquified gas into the at least one substantial horizontal fracturing borehole whereby, upon vaporization of the additional quantity of liquified gas in the at least one substantially horizontal fracturing borehole, a remaining portion of the formation surrounding the at least one substantially horizontal fracturing borehole is additionally fractured thereby creating a network of fractures.

13. The method of claim 12 further comprising the steps of:
actuating at least one of the remotely controlled valves to substantially prevent fluid communication between the substantially vertical borehole and the at least one substantially horizontal fracturing borehole; and
actuating at least one of the remotely controlled valves to substantially permit fluid communication between the substantially vertical borehole and each of the at least one substantially horizontal injection borehole and the at least one substantially horizontal production borehole.

14. The method of claim 13 wherein the at least one substantially horizontal fracturing borehole comprises a plurality of substantially horizontal fracturing boreholes, and wherein at least two of the fracturing boreholes are disposed on substantially opposite sides of the substantially vertical borehole and in a direction substantially perpendicular to the direction of least regional stresses.

15. The method of claim 14, wherein the quantity of liquified gas is provided via the plurality of substantially horizontal injection boreholes and the substantially vertical borehole into the at least one substantially horizontal fracturing borehole.

16. The method of claim 14, wherein the initial quantity of liquified gas injected into the plurality of substantially horizontal fracturing boreholes is an amount sufficient to fracture the formation at least about one half the distance between adjacent boreholes and wherein the additional quantity of liquified gas injected into the plurality of substantially horizontal fracturing boreholes is an amount sufficient to fracture the formation the remaining distance between adjacent boreholes.

17. The method of claim 12 wherein the initial quantity of liquified gas and the additional quantity of liquified gas are each injected into the at least one substantially horizontal fracturing borehole at a pressure of at least about 500 psi.

18. The method of claim 17 wherein the injection rate of the initial quantity of liquified gas and the injection rate of the additional quantity of liquified gas is about 5 barrels per minute for a period of time of about 2 minutes.

19. The method of claim 12 wherein the subsurface formation includes a dry geothermal formation and the at least one substantially horizontal production borehole is disposed above the at least one substantially horizontal fracturing borehole, and the at least one substantially horizontal fracturing borehole is disposed above the plurality of substantially horizontal injection boreholes.

20. The method of claim 19 further comprising the steps of:
providing water via the plurality of substantially horizontal injection boreholes into the network of fractures whereby the water is transformed into steam when the water contacts the formation via the network of fractures.

21. The method of claim 12, wherein the subsurface formation includes a wet geothermal formation.

22. The method of claim 12, wherein the subsurface formation includes a gas shale formation.

23. The method of claim 11 wherein the liquified gas is liquid nitrogen.

* * * * *